(12) United States Patent
Kadoriku et al.

(10) Patent No.: US 9,752,758 B2
(45) Date of Patent: Sep. 5, 2017

(54) ILLUMINATION APPARATUS

(71) Applicant: Panasonic Intellectual Property Management Co., Ltd., Osaka (JP)

(72) Inventors: Shinji Kadoriku, Osaka (JP); Ryoma Murase, Osaka (JP); Takashi Matsuda, Osaka (JP); Masaru Fujita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/318,345

(22) PCT Filed: May 25, 2015

(86) PCT No.: PCT/JP2015/002610
§ 371 (c)(1),
(2) Date: Dec. 12, 2016

(87) PCT Pub. No.: WO2015/198527
PCT Pub. Date: Dec. 30, 2015

(65) Prior Publication Data
US 2017/0122528 A1    May 4, 2017

(30) Foreign Application Priority Data

Jun. 27, 2014   (JP) .................................. 2014-132238

(51) Int. Cl.
*F21V 13/04*   (2006.01)
*F21V 5/00*    (2015.01)
(Continued)

(52) U.S. Cl.
CPC .......... *F21V 13/04* (2013.01); *F21S 48/1225* (2013.01); *F21S 48/1317* (2013.01); *F21V 5/007* (2013.01);
(Continued)

(58) Field of Classification Search
CPC ........ F21V 5/007; F21V 5/008; F21V 7/0066; F21V 7/0091; F21V 13/04; F21S 48/1225; F21S 48/1317
See application file for complete search history.

(56) References Cited

U.S. PATENT DOCUMENTS

2004/0027834 A1   2/2004   Chigusa et al.
2004/0042212 A1   3/2004   Du et al.
(Continued)

FOREIGN PATENT DOCUMENTS

CN   101238590 A   8/2008
CN   103123078 A   5/2013
(Continued)

OTHER PUBLICATIONS

International Search Report of PCT application No. PCT/JP2015/002610 dated Aug. 11, 2015.
(Continued)

*Primary Examiner* — David V Bruce
(74) *Attorney, Agent, or Firm* — Panasonic IP Management; Kerry S. Culpepper

(57) ABSTRACT

An illumination apparatus includes a light-emitting element, a first lens, and a second lens. A first incident surface of the first lens faces the light-emitting element, and guides a light beam from the light-emitting element to a radiation port. A second incident surface of the first lens guides a light beam not passing through the first incident surface to a direction toward the outer periphery of the first lens. A first reflection surface of the first lens reflects a light beam from the second incident surface to guide the light beam to the radiation port.

14 Claims, 37 Drawing Sheets

(51) Int. Cl.
F21V 7/00 (2006.01)
F21S 8/10 (2006.01)
(52) U.S. Cl.
CPC ............ *F21V 5/008* (2013.01); *F21V 7/0066* (2013.01); *F21V 7/0091* (2013.01)

(56) References Cited

U.S. PATENT DOCUMENTS

2009/0147529 A1* 6/2009 Ajiki .................... F21S 48/1154
362/511
2010/0142207 A1 6/2010 Yoneda et al.

FOREIGN PATENT DOCUMENTS

| JP | 2004-071409 | 3/2004 |
| JP | 2005-537665 | 12/2005 |
| JP | 2009-238615 | 10/2009 |
| WO | 2007/013563 | 2/2007 |

OTHER PUBLICATIONS

English Translation of Front pages of Chinese Office Action and Chinese Search Report dated May 26, 2017 for the related Chinese Patent Application No. 201580033544.0.

\* cited by examiner

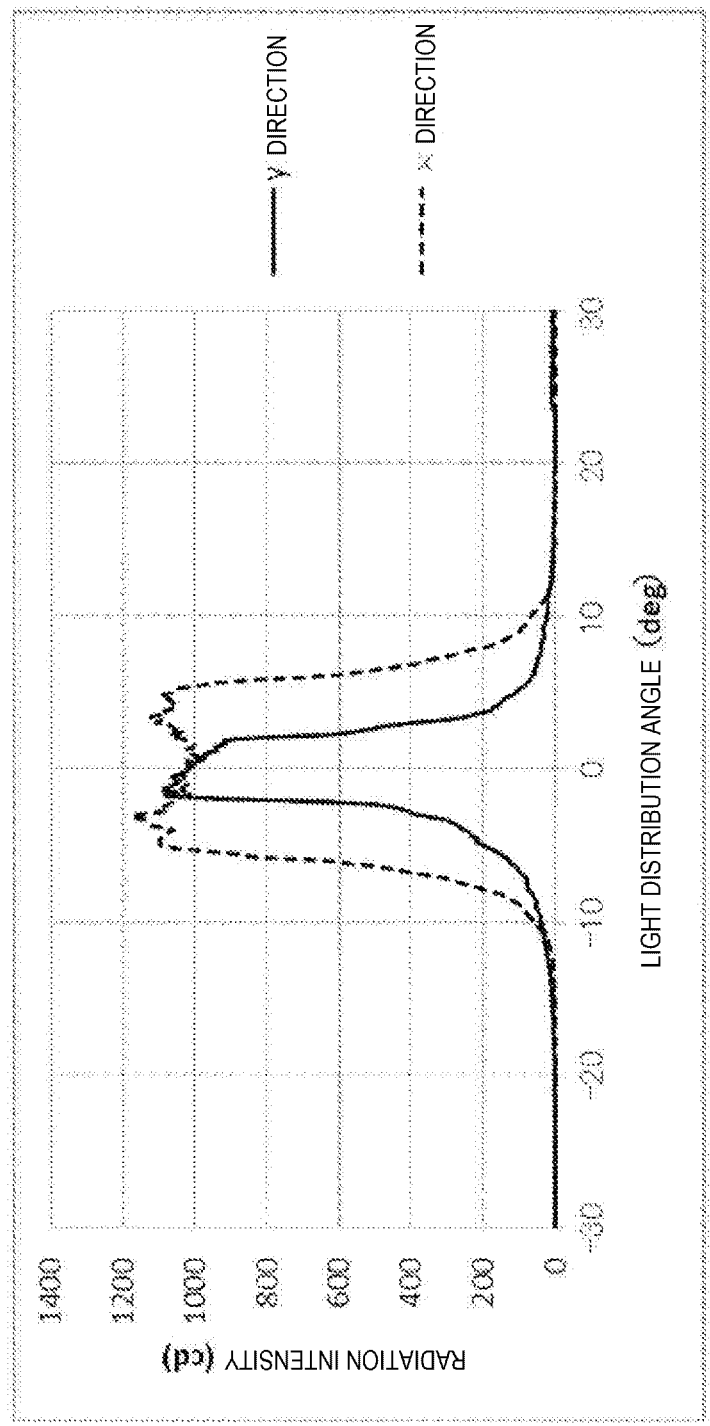

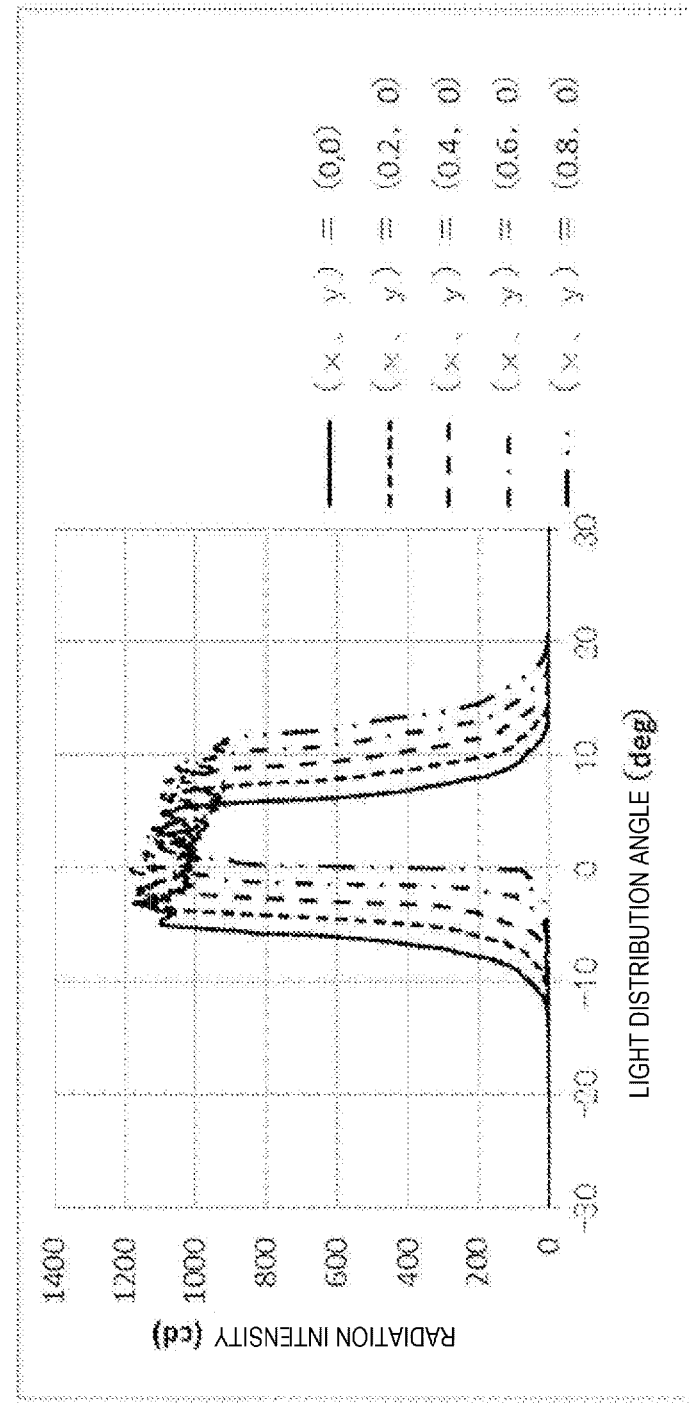

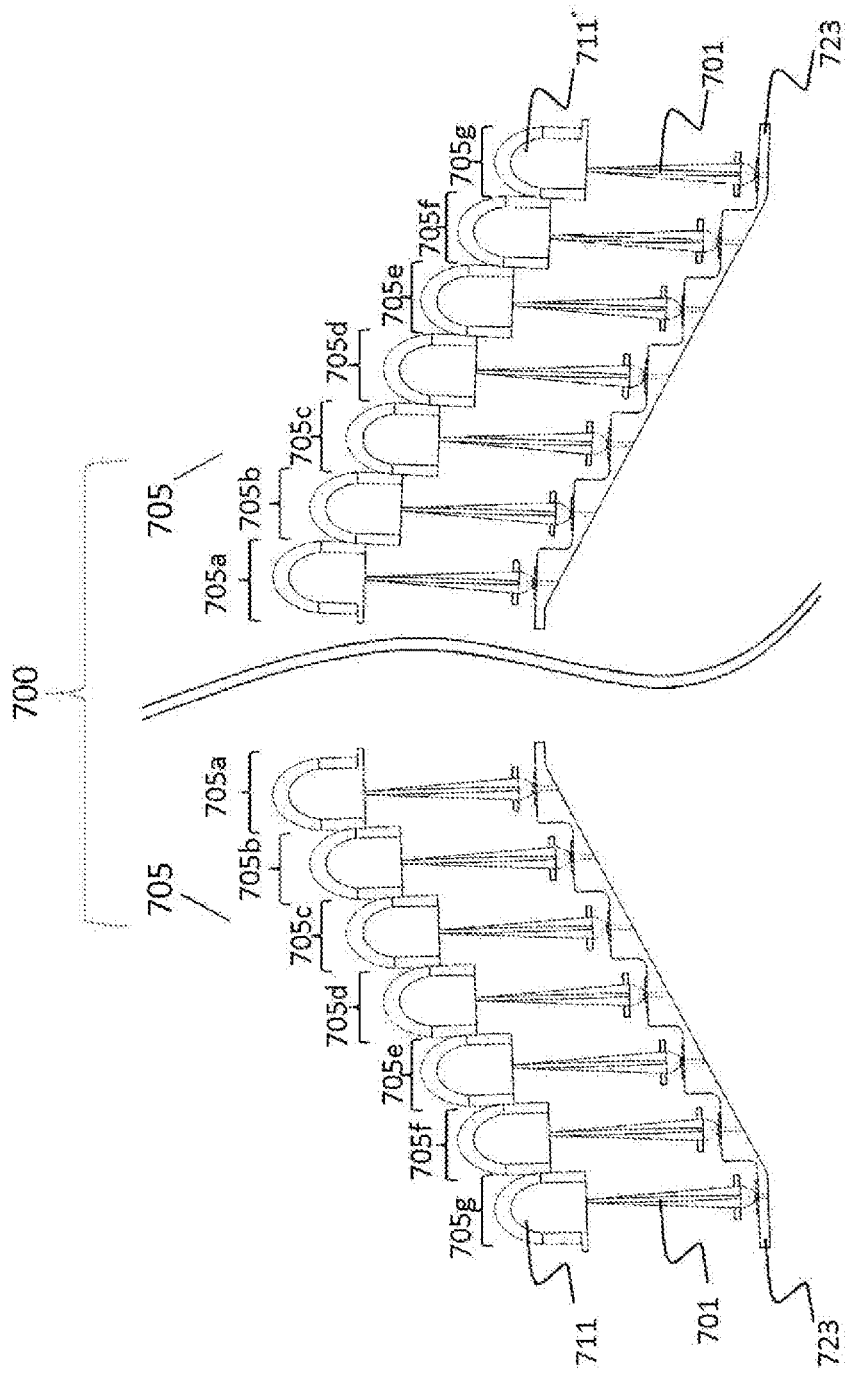

ILLUMINATION APPARATUS

CROSS-REFERENCE TO RELATED APPLICATIONS

This application is a U.S. national stage application of the PCT International Application No. PCT/JP2015/002610 filed on May 25, 2015, which claims the benefit of foreign priority of Japanese patent application 2014-132238 filed on Jun. 27, 2014, the contents all of which are incorporated herein by reference.

TECHNICAL FIELD

The present disclosure relates to an illumination In particular, the disclosure relates to an illumination apparatus (headlamp) and an illumination method for use in vehicles.

BACKGROUND

In the past, an illumination apparatus 100 using light-emitting diodes (LEDs) has been utilized as a vehicle headlamp (e.g., JP-A-2005-537665).

FIG. 1 is a cross-section view of the illumination apparatus 100. The illumination apparatus 100 includes a light-emitting element 10, a substrate 11, and a reflection plate 12. Light emitted from the LED light source 10 is reflected on the reflection plate 12, and is radiated to the front direction through an opening 13.

The light-emitting element 10 is a point light source that includes a high-output LED. The shape of the reflection plate 12 is designed optically with respect to the point light source. Since the light-emitting element 10 includes a high-output LED, it generates a large amount of heat. Therefore, a cooling mechanism (not shown in figures) is provided on or below the substrate 11.

SUMMARY

The disclosure provides an illumination apparatus that is thin and that does not require any special heat-releasing structures, even though the illumination apparatus includes an LED.

The illumination apparatus of the disclosure includes a light-emitting element, a first lens, and a second lens. The first lens faces the light-emitting element, and has a radiation port from which a light beam is radiated, a first incident surface, a second incident surface, a first reflection surface, and a second reflection surface. The second lens faces the radiation port. The first incident surface faces the light-emitting element, and guides alight beam from the light-emitting element to the radiation port. The second incident surface guides a light beam not passing through the first incident surface to a direction toward the outer periphery of the first lens. The first reflection surface reflects a light beam from the second incident surface to guide the light beam to the radiation port. The second reflection surface reflects a light passing through the first incident surface and then deviating from a direction toward the radiation port, and a light beam reflected on the first reflection surface and then deviating from the direction toward the radiation port, to guide these light beams to the radiation port.

According to the above configuration, since the first lens collects the light beams at the radiation port, and the second lens radiates the light beams, the output can be suppressed while high light utilization efficiency is secured. Furthermore, since any reflection plates are not used, it becomes possible to provide a small-sized and thin illumination apparatus. Furthermore, any special heat-releasing structures are not required.

BRIEF DESCRIPTION OF THE DRAWINGS

FIG. 16C is a diagram that shows a light distribution in the case shown in FIG. 16B.

FIG. 17A is a diagram that shows changes in light distribution characteristics in the x direction in a case where the second lens is moved to a point 0.8 mm away in the right direction (x-plus direction) in increments of 0.2 mm in the illumination unit relating to FIGS. 16A to 16C.

FIG. 23C FIG. 23B is a perspective view of a first lens in the illumination apparatus shown in FIG. 23A.

FIG. 24A is a lateral view of an illumination apparatus according to a fifth embodiment.

DESCRIPTION OF EMBODIMENTS

Prior to describing embodiments of the invention, problems in conventional illumination apparatuses will briefly be mentioned. The illumination apparatus disclosed in JP-A-2005-537665 has one LED, and therefore, in order to secure sufficient illuminance, it is required to realize an even higher output of it. However, along with achievement of such a higher output, an amount of heat generation will be increased. For that reason, a cooling mechanism is further required. Furthermore, in view of optical design, it is required to also increase a size of a part including a reflection plate.

First Embodiment

Figure 1:
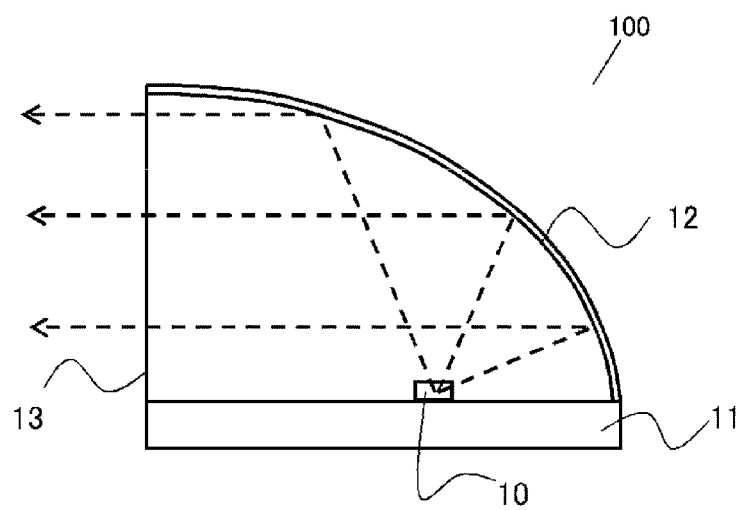
FIG. 1 is a cross-section diagram of a conventional illumination apparatus.
Figure 2:
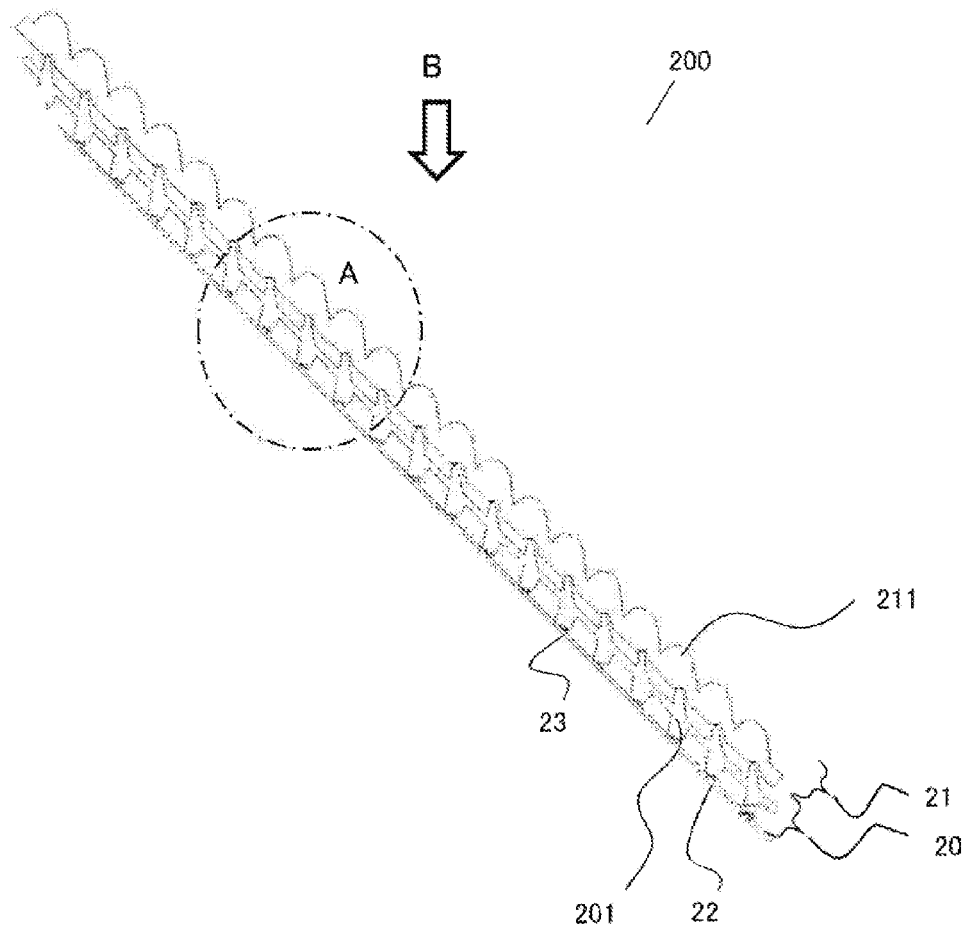
FIG. 2 is a cross-section diagram of an illumination apparatus according to a first embodiment.
Figure 3A:
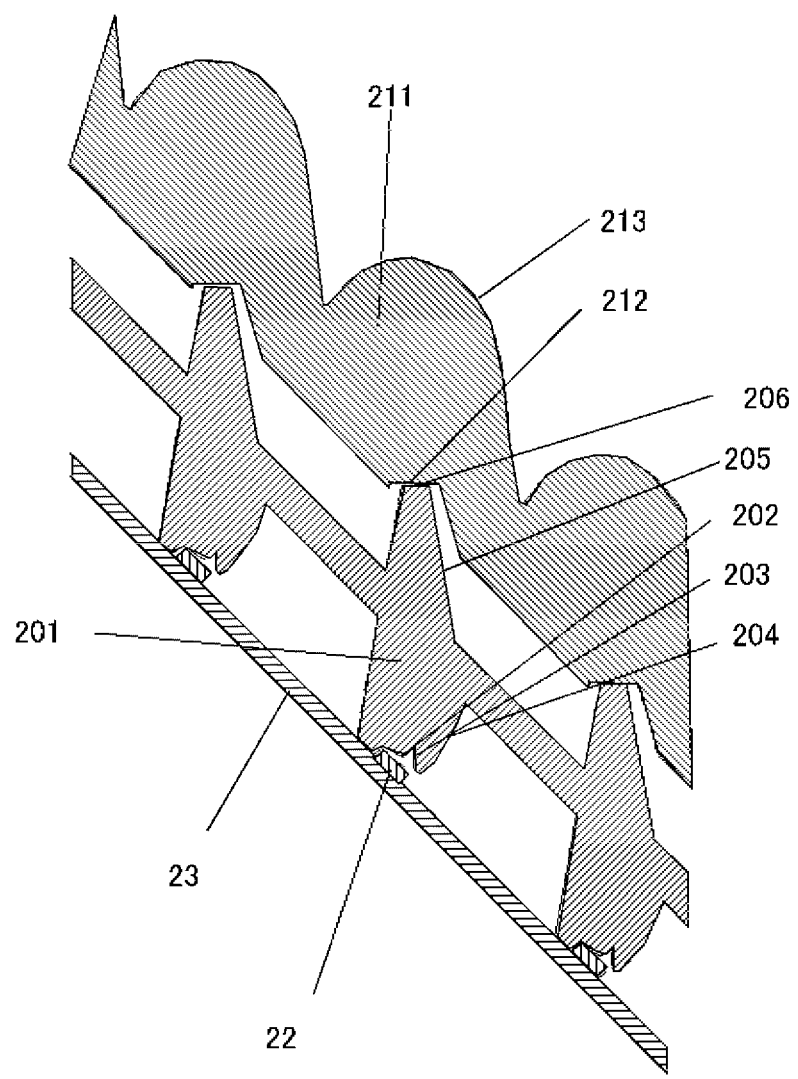
FIG. 3A is an enlarged cross-section diagram of the region A in FIG. 2.
Figure 3B:
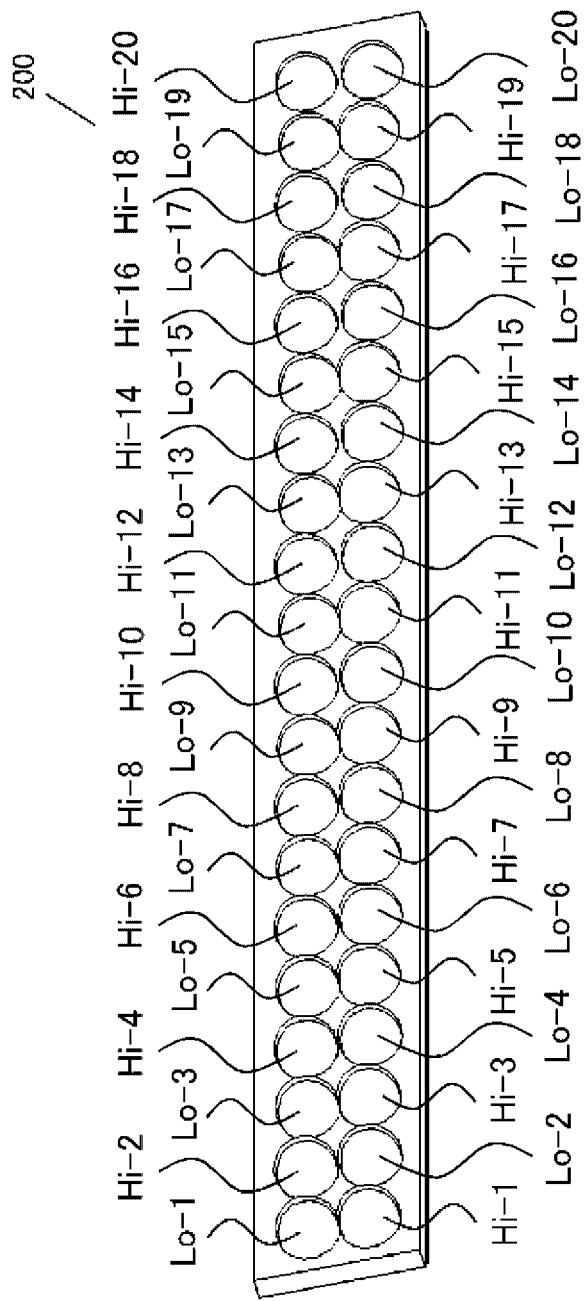
FIG. 3B is a plan diagram of the illumination apparatus shown in FIG. 2 when viewed from the direction shown by the arrow B.
Figure 4:
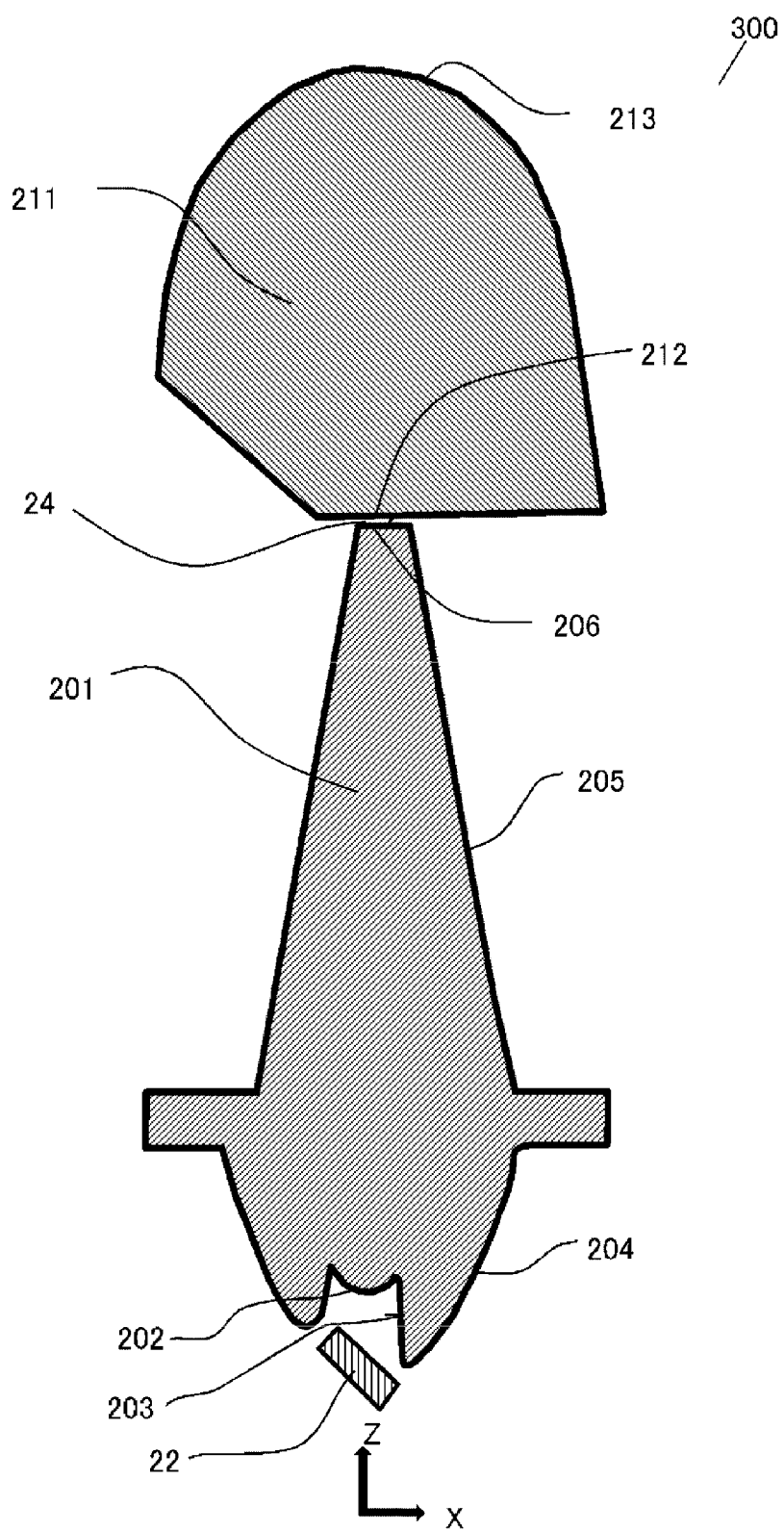
FIG. 4 is a cross-section diagram of one unit (illumination unit) of a lens-element part of the illumination apparatus shown in FIG. 2.

FIG. 2 is a cross-section view of an illumination apparatus 200 according to a first embodiment. FIG. 3A is an enlarged cross-section view of the part A in FIG. 2. FIG. 3B is a plan view of the illumination apparatus shown in FIG. 2 when viewed from the direction B. FIG. 4 is a cross-section configuration diagram of one unit of a lens-element part in the illumination apparatus 200.

<Illumination Apparatus 200>

The illumination apparatus 200 includes: a first lens unit 20; a second lens unit 21 that is located above the first lens unit 20; multiple light-emitting elements 22 that are located below the first lens unit 20; and a substrate 23 on which the light-emitting elements 22 are mounted.

The light-emitting elements 22 are laser diodes, and the multiple light-emitting elements 22 are mounted on the substrate 23. In order to attach the illumination apparatus 200 to the front, right and left corners of a vehicle, the substrate 23 is placed so as to be inclined with respect to the light-radiation direction.

The first lens unit 20 includes multiple first lenses 201 that are located in positions above the multiple light-emitting elements 22, respectively. The first lens unit 20 is produced by resin-molding using, as a material, a transparent resin such as an acrylic resin or polycarbonate resin, in such a manner that the multiple first lenses 201 are integrated into the first lens unit 20.

The second lens unit 21 is placed above the first lens unit 20, and includes multiple second lenses 211 that are located in positions corresponding to the respective first lenses 201. The second lens unit 21 is also produced by resin-molding using, as a material, a transparent resin such as an acryl resin or polycarbonate resin, in such a manner that the multiple second lenses 211 are integrated into the second lens unit 21.

<Illumination Unit 300>

An illumination unit 300 will now be described with reference to FIG. 4. The illumination unit 300 corresponds to one part of the illumination apparatus 200 in FIG. 2, and includes one first lens 201 and one second lens 211.

There is a gap 24 between the first lens 201 and the second lens 211. If the gap 24 is wide, light distribution characteristics will also be wide. Therefore, the gap 24 is preferably narrow. Specifically, the gap 24 is preferably 1/20 or less of the thickness of the second lens 211.

A lower part of the first lens 201 is larger than its upper part. Moreover, a recessed part is provided in the lower part of the first lens 201. The first lens 201 has a first incident surface 202 and a second incident surface 203 within the recessed part. Furthermore, the first lens 201 has a first reflection surface 204 in its lower part and a second reflection surface 205 in its lower part. The second reflection surface 205 surrounds the radiation port 206 that has a planar shape. The upper part of the first lens 201 is cone-shaped, and its diameter gradually becomes smaller toward the upper direction. The first lens 201 has the radiation port 206 on its upper surface.

The second lens 211 is located ahead of the radiation port 206 of the first lens 201 across the gap 24. In other words, the radiation port 206 faces the second lens 211 across the gap 24. Light emitted from the radiation port 206 enters the planar incident surface 212 of the second lens 211, and is refracted and collimated by the convex emission surface 213.

In the illumination apparatus 200 shown in FIG. 3B, multiple illumination units 300 are arrayed for use as high beams Hi and low beams Lo. The use as high beams Hi and low beams Lo will be described below.

<Optical Paths in the First Lens 201>

Figure 5:
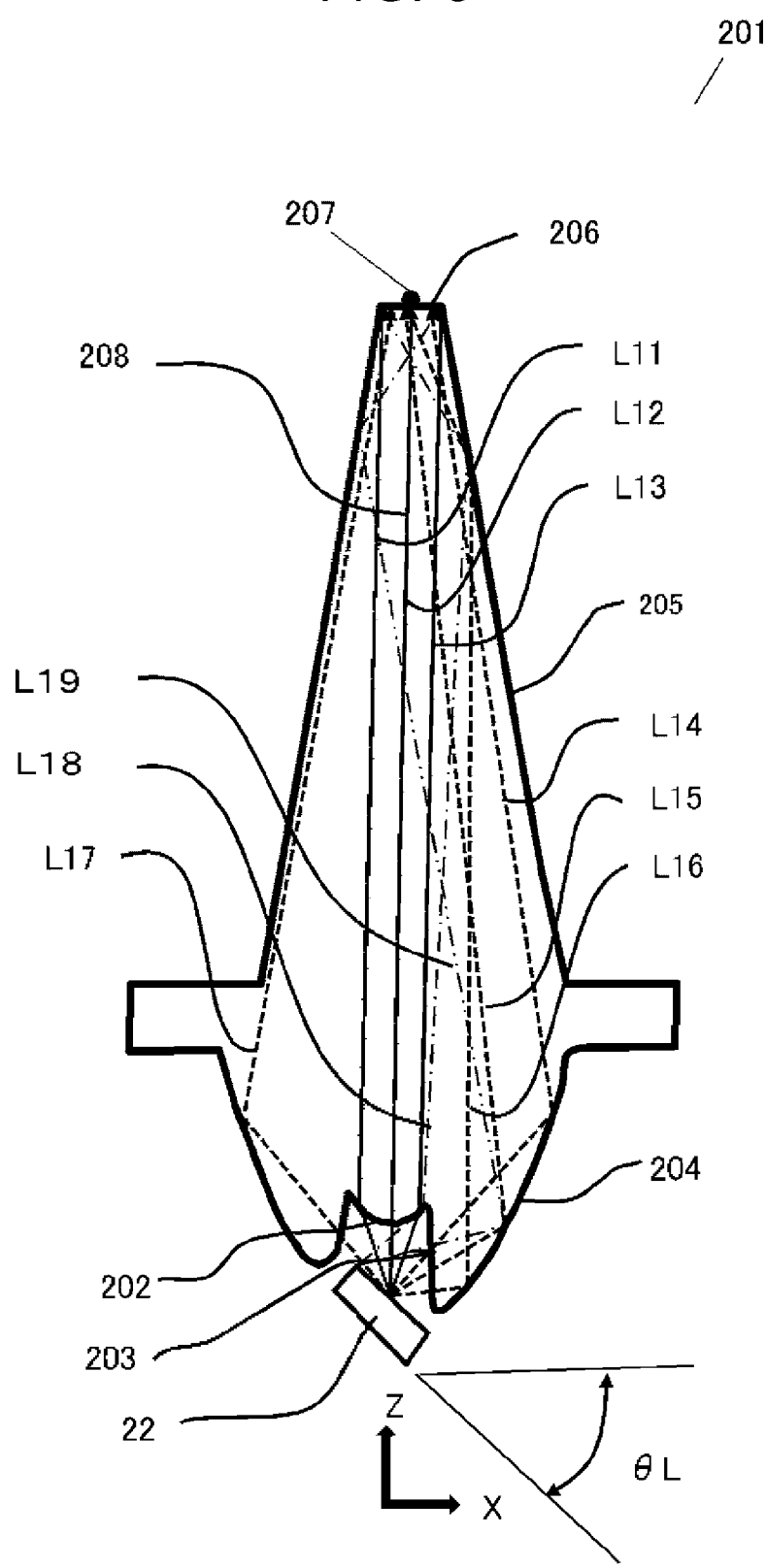
FIG. 5 is a schematic diagram that shows pathways of light inside the first lens in the illumination apparatus shown in FIG. 2.

With reference to the cross-section view shown in FIG. 5, pathways of light (optical paths) that pass through the first lens 201 will now be described. In addition, although FIG. 5 is a cross-section view, hatched lines are not used in order to show pathways of light. When pathways of light are shown, the same shall apply to other figures.

The first incident surface 202 is placed on the optical axis of the light-emitting element 22. The first incident surface 202 has a shape of convex lens, and light beams L11, L12 and L13 that passed through the first incident surface 202 have been collimated, and proceed to the radiation port 206. Although the light beams L11, L12 and L13 are not necessarily collimated, it is required that they are guided to the radiation port 206.

Light beams L14, L15 and L16 that are not incident on the first incident surface 202 enter the first lens 201 via the second incident surface 203, are regularly reflected on first reflection surface 204, and proceed to the radiation port 206.

The shape of the first reflection surface 204 is arranged in such a manner that the light that has been reflected on the first reflection surface 204 travels approximately parallel to the second reflection surface 205. However, in the vicinity of the second incident surface 203, an angle between the optical axis and a line perpendicular to the surface is set to be equal to or larger than a critical angle of the resin (42.15° in case of an acrylic resin) in order to maintain the total reflection. Although total reflection is preferable, merely a reflection may be sufficient.

A light beam L18 is a light beam that has been emitted from some point other than the center of the light-emitting element 22, and that has passed through the first incident surface 202. A light beam L19 is a light beam that has been emitted from some point other than the center of the light-emitting element 22 and that has passed through the second incident surface 203, followed by being reflected on the first reflection surface 204.

The light beams L18 and L19, the light beam L16 that has been reflected on the first reflection surface 204 in the vicinity of the second incident surface 203, etc. are regularly reflected on the second reflection surface 205, and proceed to the radiation port 206.

A light beam L17 is a light beam that proceeds toward the direction opposite to the second incident surface 203, and proceeds to the radiation port 206 in the same manner as the other light beams.

Although a tilt θ1, of the light-emitting element 22 with respect to the center 207 (approximately identical to the optical axis 208 of the first lens) of the radiation port of the first lens 201 can be set without any limitation, it is preferable that the tilt θ1, is set to 50° or less. If the tilt θ1, exceeds 50°, the radiation efficiency may drastically be decreased.

As seen from the above description, the first lens 201 is a light-collecting lens.

<Optical Paths in the Second Lens 211>

Figure 6:
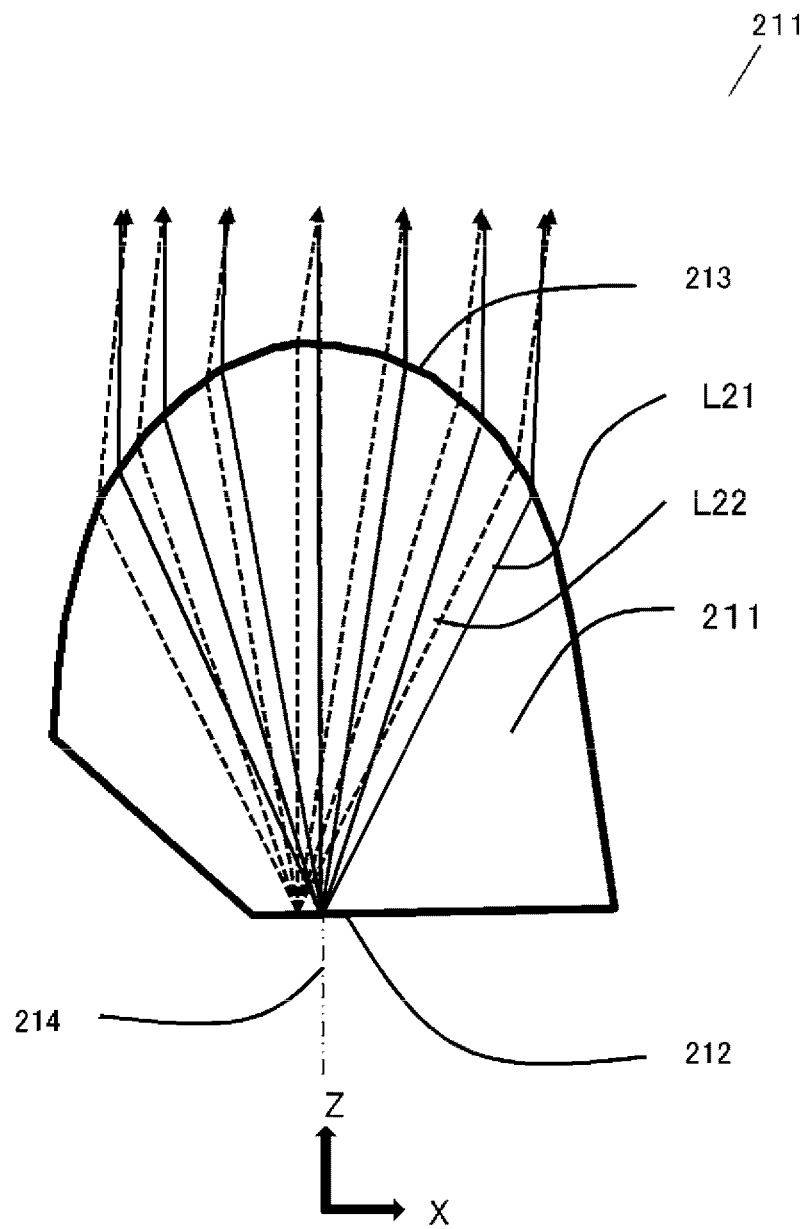
FIG. 6 is a schematic diagram that shows pathways of light that has entered the second lens in the illumination apparatus shown in FIG. 2.

FIG. 6 is a cross-section view of the second lens 211. The second lens 211 has an optical axis 214. As shown by solid lines, light beams L21 that have entered the second lens 211 from the optical axis 214 come outside from the emission surface 213. All of the emitted light beams become rays of light parallel to the optical axis 214, and they are radiated therefrom in that state.

On the other hand, as shown by dotted lines, light beams L22 that have entered the second lens 211 in a state in which they deviate from the optical axis 214 are formed into light beams that are slightly inclined with respect to the optical axis 214, and they are radiated therefrom in that state.

Although all light beams L21 that entered the second lens 211 from the optical axis 214 and that have been emitted from the emission surface 213 are parallel to one another, light beams L22 that entered the second lens 211 in a state in which they deviate from the optical axis 214 and that have been emitted from the emission surface 213 are not parallel to one another, and each have a radiation angle.

The larger the positional shift from the optical axis 214 is, the larger the radiation angle is.

Finally, light beams emitted from the second lens 211 are oriented to be radiated to a certain region.

<Optical Paths in the Illumination Unit 300>

Figure 7A:
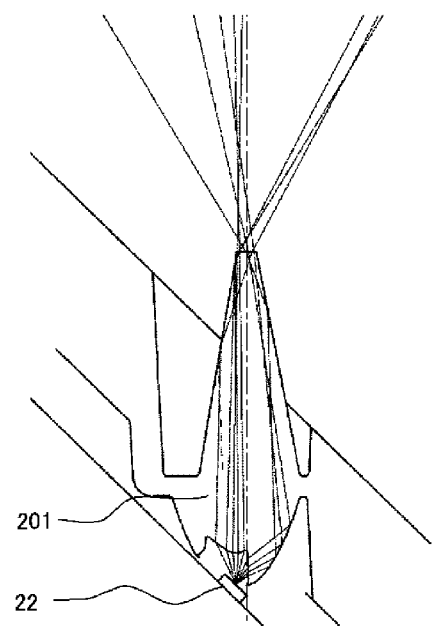
FIG. 7A is a diagram that shows light radiation characteristics in a case where second lenses are not placed in the illumination apparatus shown in FIG. 2.
Figure 7B:
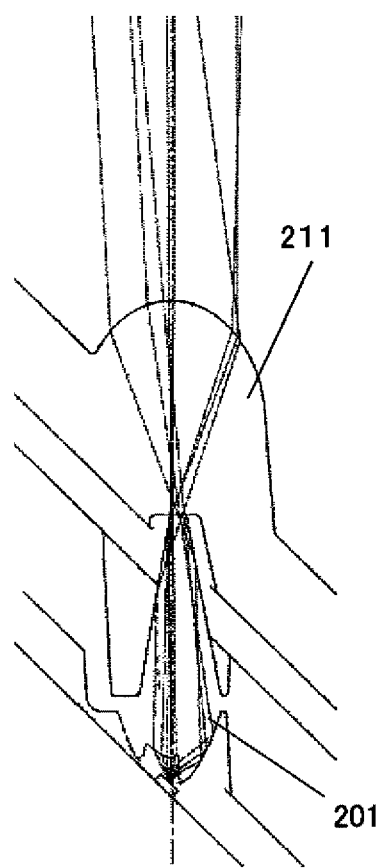
FIG. 7B is a diagram that shows light radiation characteristics in a case where positions of centers of optical axes of second lenses are identical to positions of respective centers of radiation ports of first lenses in the illumination apparatus shown in FIG. 2.

FIGS. 7A to 7D are cross-section views of illumination units 300, and optical paths. FIG. 7A shows optical paths in a case where second lenses 211 are not present. FIG. 7B shows optical paths in a case where the center of the optical axis 214 of the second lens 211 is located at the same position as the center of the radiation port 207 of the first lens 201. Light beams that have been radiated from the first lens 201 have wide light distribution angles, and, when they pass through the second lens 211, they are collimated, and light beams with narrow light distributions are obtained.

Figure 7C:
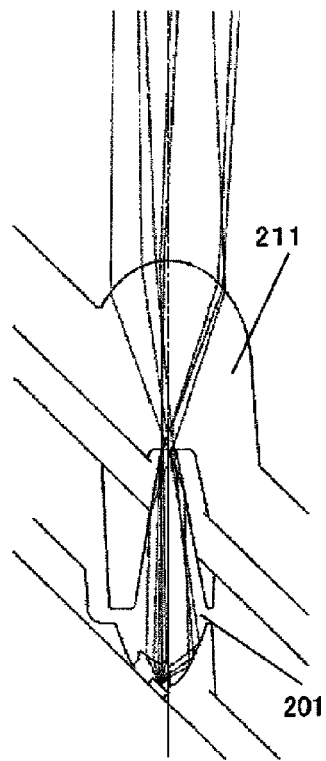
FIG. 7C is a diagram that shows light radiation characteristics in a case where centers of optical axes of second lenses are shifted toward the right side with respect to respective centers of radiation ports of first lens by 0.4 mm in the illumination apparatus shown in FIG. 2.
Figure 7D:
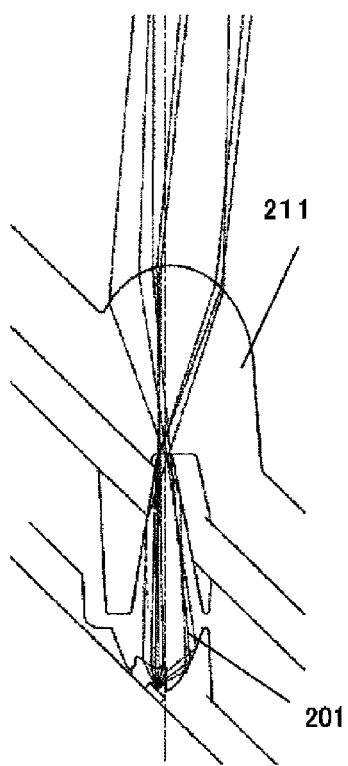
FIG. 7D is a diagram that shows light radiation characteristics in a case where centers of optical axes of second lenses are shifted toward the right side with respect to respective centers of radiation ports of first lens by 0.8 mm in the illumination apparatus shown in FIG. 2.

FIG. 7C shows changes in the directions of radiated light beams in a case where the position of the second lens 211 is shifted to the right by 0.4 mm with respect to FIG. 7B. Furthermore, FIG. 7D shows changes in the directions of radiated light beams in a case where the position of the second lens 211 is shifted to the right by 0.8 mm with respect to FIG. 7B. The thickness of the second lens 211 is 13 mm.

As seen from FIGS. 7B to 7D, radiation directions of light beams that are radiated from the second lens 211 vary with changes in an amount of positional shift between the center 207 of the radiation port of the first lens 201 and the optical axis 214 of the second lens 211. In other words, by changing relative positions of the center 207 of the radiation port of the first lens 201 versus the optical axis 214 of the second lens 211, the radiation directions of light can be varied.

With regard to illumination apparatuses 200 for use as headlamps, when vehicles pass each other, it is required that light beams in that direction are rapidly suppressed, in order to prevent the light beams from dazzling each of the drivers. That is, rapid changes in the cutoff-line illuminance in a passing beam are required.

In this embodiment, the center 207 of the radiation port of the first lens 201, and the optical axis 214 of the second lens 211 are slightly shifted from each other, thereby realizing rapid changes in the illuminance.

<Shapes of the First Lens 201 and the Second Lens 211>

Figure 8A:
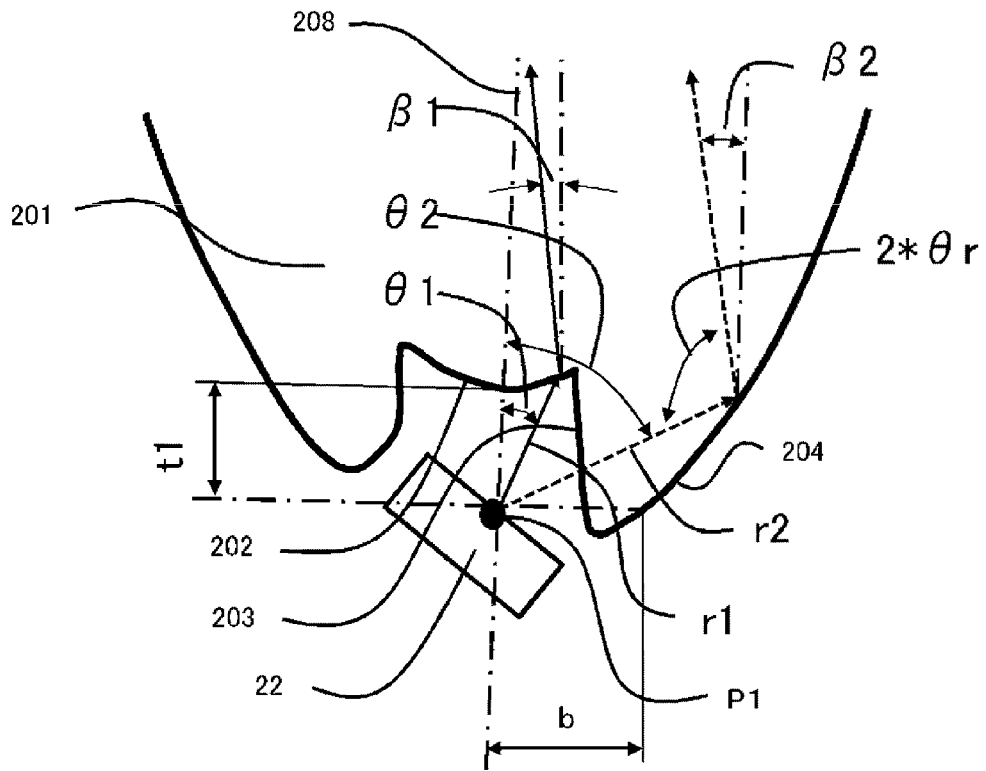
FIG. 8A is a diagram that shows variables used in a shape formula for first lenses in the illumination apparatus shown in FIG. 2.
Figure 8B:
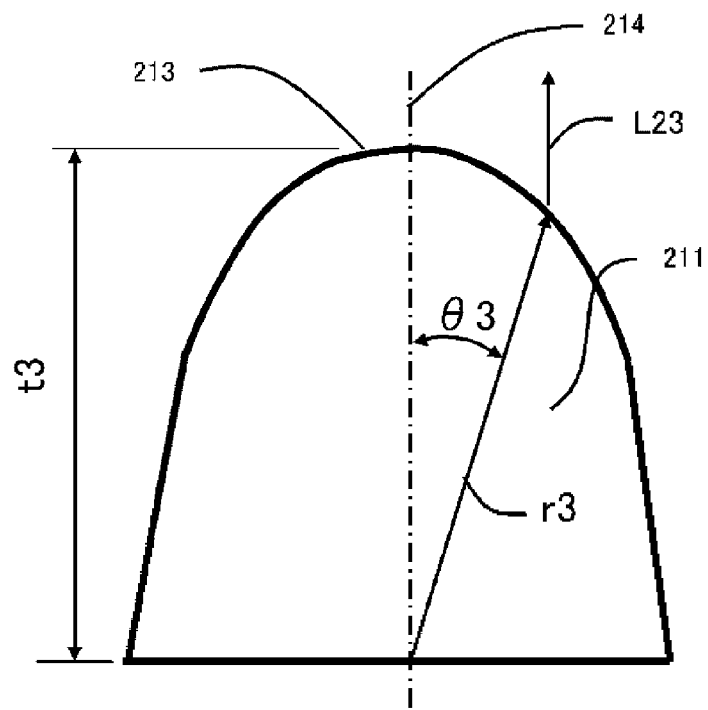
FIG. 8B is a diagram that shows variables used for a shape formula for second lenses in the illumination apparatus shown in FIG. 2.

FIGS. 8A and 8B are partial cross-section views of the first lens 201 and the second lens 211, respectively. FIG. 8A is a diagram that shows variables relating to the shape of the first lens 201, and FIG. 8B is a diagram that shows variables relating to a shape formula for the emission surface 213 of the second lens 211.

(1) Shape of the First Incident Surface 202 of the First Lens 201

A distance r1 between the center P1 of the light-emitting surface of the light-emitting element 22 and the first incident surface 202 of the first lens 201 is given by Formula 1, which is a function of an angle θ1 between the optical axis 208 of the first lens and a vector with a length of the distance r1.

$$r1 = t1 * (n*\cos(\beta 1) - 1)/(n*\cos(\theta 1 + \beta 1) - 1) \qquad \text{(Formula 1)}$$

In Formula 1, n is a refractive index of a lens material, and, in a case in which the material is an acrylic resin, the refractive index n is 1.49. The angle θ1 is an angle between a refracted light beam that has entered the first incident surface 202, and the optical axis 208 of the first lens. The distance t1 is a distance between the light-emitting element 22 and the first incident surface 202, on the optical axis 208 of the first lens.

(2) Shape of the First Reflection Surface 204 of the First Lens 201

A distance r2 between the center P1 of the light-emitting surface of the light-emitting element 22 and the first reflection surface 204 of the first lens 201 is given by Formula 2, which is a function of an angle θ2 between the optical axis 208 of the first lens and the distance r2.

$$r2=b*(1+\sin(\beta 2))/(1-\cos(\theta 2+\beta 2)) \quad \text{(Formula 2)}$$

In Formula 2, the distance b is a distance between an intersection of a line passing through the center P1 of the light-emitting surface and perpendicular to the optical axis 208 of the first lens, with the first reflection surface 204, and the center P1 of the light-emitting surface. The angle β2 is an angle between a light beam reflected on the first reflection surface 204 and the optical axis 208 of the first lens.

(3) Size of the Reflection Angle θr

If the reflection angle θr on the first reflection surface 204 is equal to or less than the critical angle θrn (a marginal angle where total reflection is possible) of the material, a light beam that is released to the outside from the first reflection surface 204 is produced. Therefore, the reflection angle θr is preferably equal to or larger than the critical angle θrn of the material. In consideration of a width of the light-emitting surface of the light-emitting element 22, when the reflection angle θr<the angle θr0 in Formula 2 given that the angle θr0 is slightly larger than the critical angle θrn, the distance r2 is given by Formula 3. Additionally, c in Formula 3 can be obtained by Formula 4, and r0 in Formula 4 can be obtained by Formula 5.

$$r2=c*\exp(-\theta 2*\tan(\theta r0)) \quad \text{(Formula 3)}$$

$$c=r0/\exp((2*\theta r0+\beta 2-\pi*\tan(\theta r0)) \quad \text{(Formula 4)}$$

$$r0=b*(1+\sin(\beta 2))/(1-\cos(\pi-2*\theta r0)) \quad \text{(Formula 5)}$$

(4) Shape of the First Reflection Surface 204 of the First Lens 201

Figure 9:
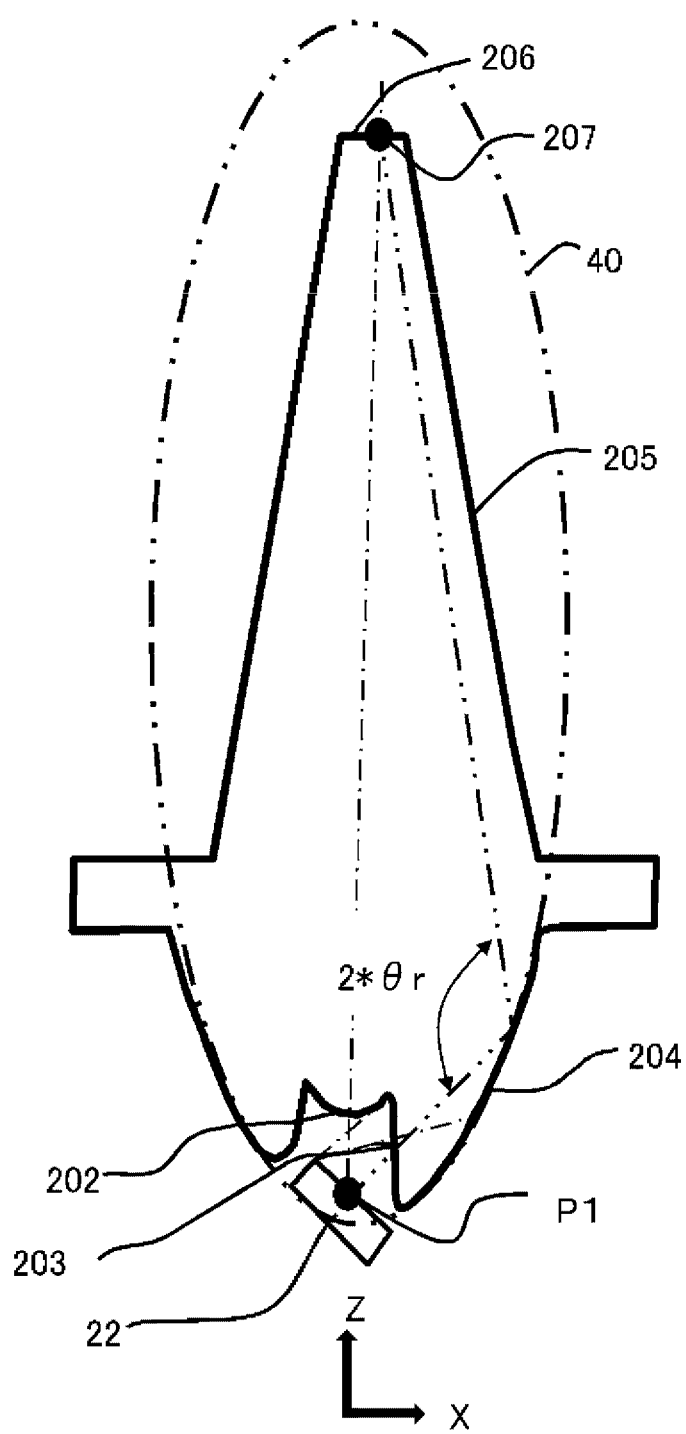
FIG. 9 is a diagram that shows the shape of the first reflection surface of the first lens in the illumination apparatus shown in FIG. 2.

FIG. 9 is a cross-section view of the first lens 201. The shape of the first reflection surface 204 of the first lens 201 may be formed by an ellipse 40 having, as focal points, the center P1 of the light-emitting surface of the light-emitting element 22 and the center 207 of the radiation port, as shown in FIG. 9. In other words, the ellipse 40 is configured by combining the circle having, as its centers, the center 207 of the radiation port and the circle having, as its center, the center P1 of the light-emitting surface of the light-emitting element 22, respectively. Even in this case, the reflection angle θr is preferably equal to or larger than the critical angle θrn of the material.

(5) Shape of the Emission Surface 213 of the Second Lens 211

With reference to FIG. 8B, a shape formula for the emission surface 213 of the second lens 211 will now be described. A distance r3 from an intersection of the optical axis 214 of the second lens 211 with the incident surface 212 to the emission surface 213 is given by Formula 6, which is a function of an angle θ3 between the optical axis 214 and a vector with a length of the distance r3.

$$r3=(n-1)*t3/(n-\cos(\theta 3)) \quad \text{(Formula 6)}$$

In Formula 6, n is a refractive index of a material of the lens, and in the case of an acrylic resin, the refractive index n is 1.49. Additionally, t3 is a thickness of the second lens 211, and, for example, t3 is 13 mm in this embodiment.

<Positional Relationship Between the First Lens 201 and the Second Lens 211>

Next, with reference to FIGS. 10A, 10B, 11A and 11B, a positional relationship between the first lens 201 and the second lens 211 will be described.

Figure 10A:
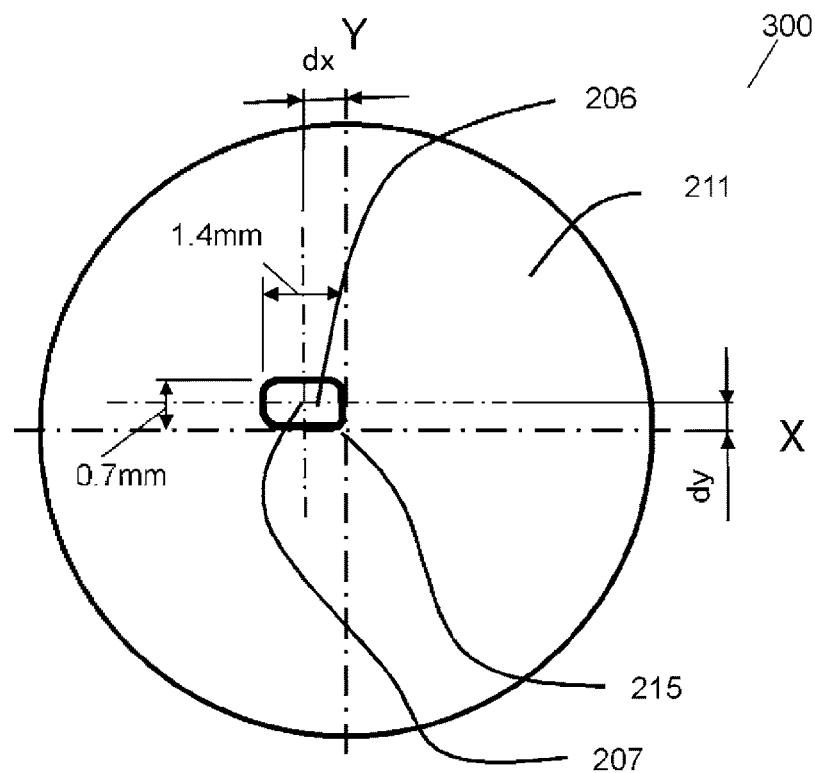
FIG. 10A is a diagram that shows a positional relationship between the radiation port of the first lens and the corresponding second lens in the illumination unit shown in FIG. 4.

FIG. 10A is a diagram of the radiation port 206 of the first lens 201 and the second lens 211 when viewed from the side where the light-emitting element 22 is present. The center 215 of the optical axis of the second lens 211 is shifted with respect to the center 207 of the radiation port 206 of the first lens 201 by a shift amount dx in the X direction and by a shift amount dy in the Y direction.

Figure 10B:
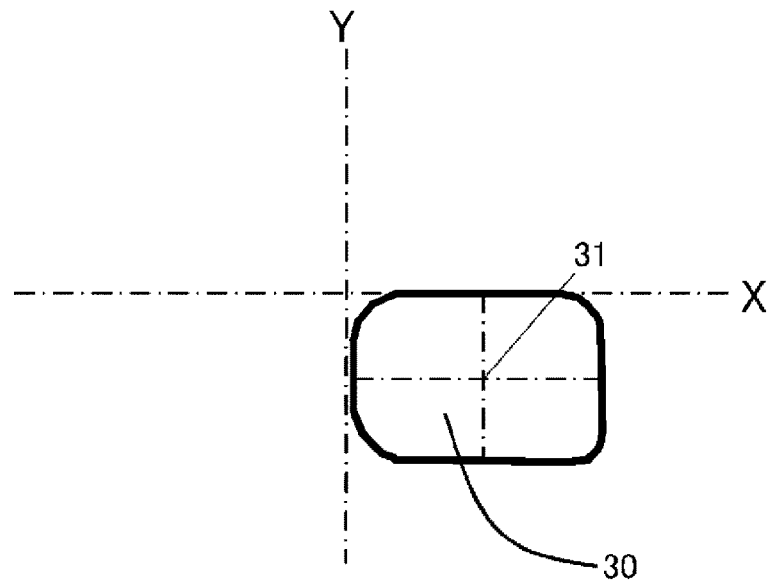
FIG. 10B is a diagram that shows an illuminance distribution on the irradiated area in a case where positional relationships between radiation ports of first lenses and corresponding second lenses are consistent with the positions shown in FIG. 10A.

FIG. 10B is a diagram that shows an illuminance distribution 30 on an irradiated area that is apart from the illumination unit 300 shown in FIG. 10A by a certain distance. The shape of the illuminance distribution 30 is similar to the shape of the radiation port 206 of the first lens 201.

The center 207 of the radiation port of the first lens 201, and the center 31 of the illuminance distribution 30 are symmetric to each other with respect to the center 215 of the optical axis of the second lens 211.

Figure 11A:
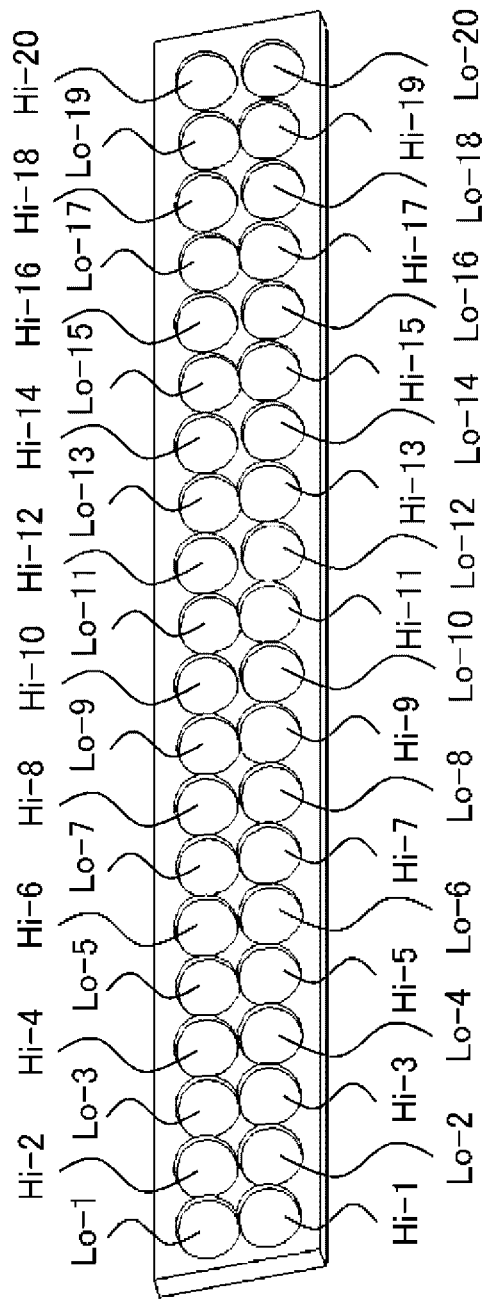
FIG. 11A is a diagram that shows locations of second lenses in the illumination apparatus shown in FIG. 3B.

FIG. 11A is a plan view that shows the layout of second lenses 211 in the second lens unit 21.

Low beams Lo-1 to Lo-20 are provided in order to emit light of a passing-beam head lamp. For use as illumination for oncoming vehicles, these low beams make it possible to rapidly cut off light passing in a certain direction.

High beams Hi-1 to Hi-20 are provided in order to emit light of a driving-beam headlamp. These high beams cause emission of light with a homogeneous distribution for the purpose of vehicle-driving.

Figure 11B:
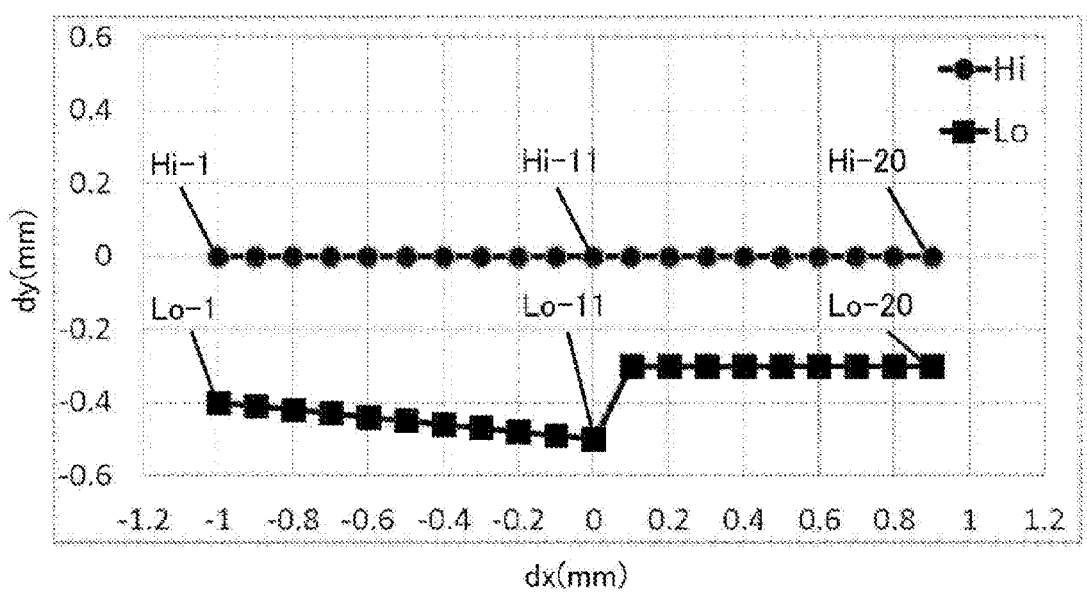
FIG. 11B is a diagram that shows a shift amount between centers of optical axes of second lenses and corresponding centers of radiation ports of first lenses in an illumination apparatus according to the first embodiment.
Figure 12A:
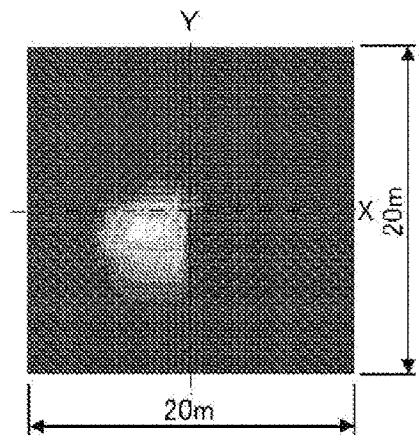
FIG. 12A is a diagram that shows a light distribution in a case where only a light-emitting element of a low beam Lo-1 has lighted up in an illumination apparatus according to the first embodiment.
Figure 12B:
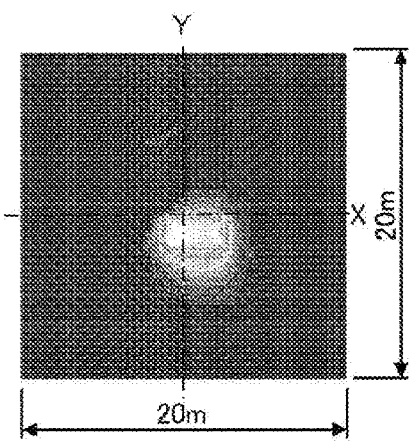
FIG. 12B is a diagram that shows a light distribution in a case where only a light-emitting element of a low beam Lo-11 has lighted up in an illumination apparatus according to the first embodiment.
Figure 12C:
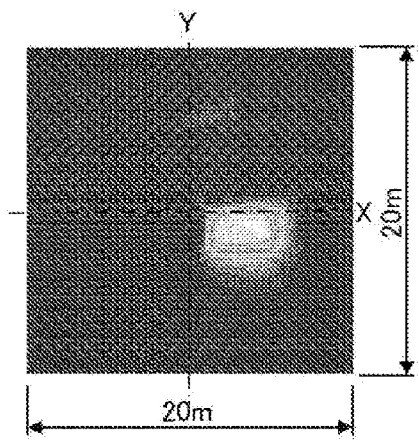
FIG. 12C is a diagram that shows a light distribution in a case where only a light-emitting element of Lo-20 has lighted up in an illumination apparatus according to the first embodiment.
Figure 12D:
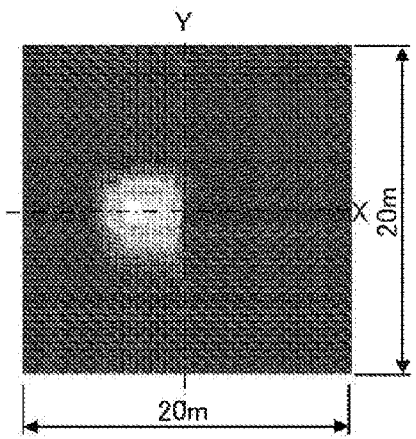
FIG. 12D is a diagram that shows a light distribution in a case where only a light-emitting element of a high beam Hi-1 has lighted up in an illumination apparatus according to the first embodiment.
Figure 12E:
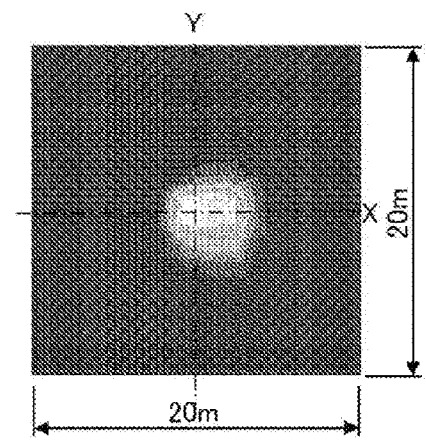
FIG. 12E is a diagram that shows a light distribution in a case where only a light-emitting element of a high beam. Hi-11 has lighted up in an illumination apparatus according to the first embodiment.
Figure 12F:
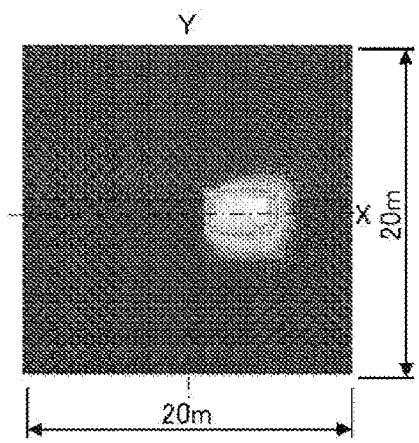
FIG. 12F is a diagram that shows a light distribution in a case where only a light-emitting element of a high beam. Hi-20 has lighted up in an illumination apparatus according to the first embodiment.

FIG. 11B is a graph that shows shift amounts dx and dy between centers 215 of the optical axes of the second lenses 211, and respective centers 207 of the radiation ports 206 of the first lens 201. Shift amounts dx of low beams Lo-1 to Lo-20 in the x direction vary in increments of 0.1 mm in the numerical order. That is, the value for the low beam Lo-1 is −1.0 mm, the value for the low beam Lo-11 is 0 mm, and the value for the low beam Lo-20 is +0.9 mm. With regard to the shift amounts dy in the Y direction, the value for the low beam Lo-1 is −0.4 mm, the low beams from Lo-1 to Lo-11 vary in increments of −0.05 mm in the numerical order, and the value for the low beam Lo-11 is −0.5 mm. Low beams Lo-12 to Lo-20 exhibit a constant value, i.e., −0.3 mm. The width of the radiation port 206 of the first lens 201 in the Y direction is 0.7 mm, and, when the shift amount dy is −0.35 mm, the upper line showing rapid changes in the illuminance distribution just agrees with the optical axis.

Shift amounts dx of high beams Hi-1 to Hi-20 in the x direction vary in increments of 0.1 mm in the numerical order, and the value for the low beam Lo-1 is −1.0 mm, the value for the low beam Lo-11 is 0 mm, and the value for the low beam Lo-20 is +0.9 mm. All of the shift amounts dy in the Y direction are constant, i.e., 0 mm.

<Results of Optical Simulation: Case-by-Case>

FIGS. 12A to 12F show light distributions 25 meters ahead of the illumination apparatuses 200 with above described conditions in cases where only light-emitting elements 22 corresponding to the respective lenses are switched on by subjecting the illumination apparatuses 200 to an optical simulation.

FIGS. 12A to 12F correspond light distributions of low beams Lo-1, Lo-11 and Lo-20, and high beams Hi-1, Hi-11 and Hi-20, respectively in the illumination apparatuses 200 according to the embodiments. That is, these figures each show light distributions 25 meters ahead of the illumination apparatuses 200 when only corresponding light-emitting elements 22 are switched on.

As seen from FIGS. 12A to 12F, parts exhibiting high illuminance appear not at the centers of illuminance distributions but at either of the sides when only one of light-emitting elements 22 is switched on. This is due to a gap between light fluxes that have been guided from the first incident surface 202 to the radiation port 206 in the first lens 201, and the light fluxes that have been reflected on the first reflection surface 204 and that have been guided to the radiation port 206 in the first lens 201 (see FIG. 5).

<Results of Optical Simulation: Low Beams Lo>

Figure 13A:
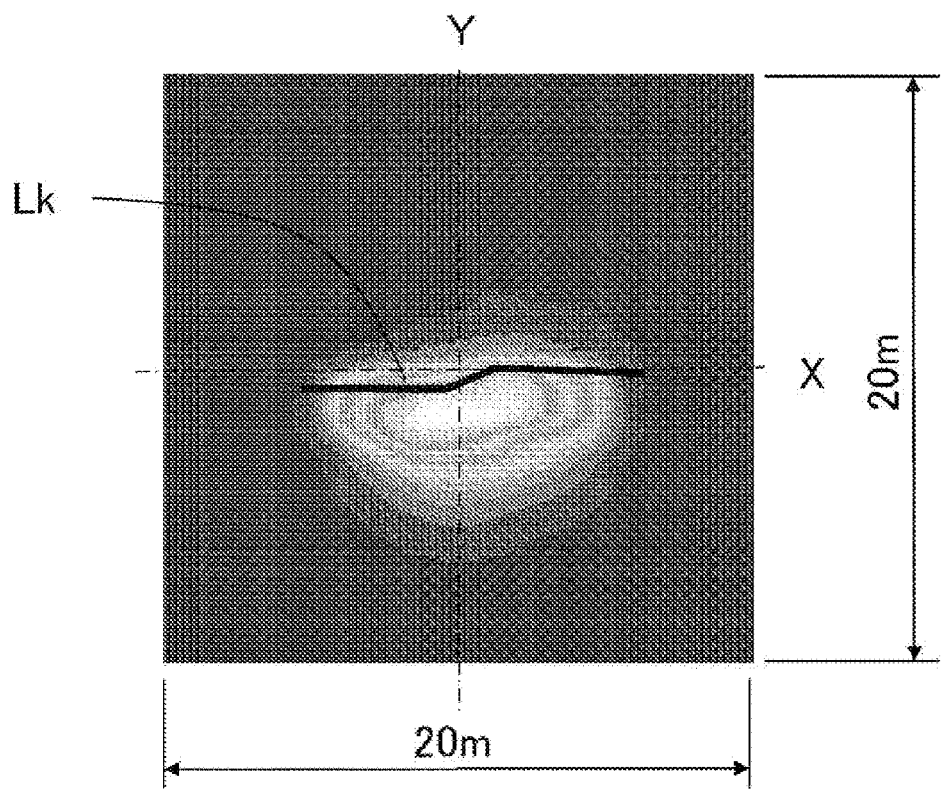
FIG. 13A is a diagram that shows a light distribution 25 meters ahead of an illumination apparatus according to the first embodiment in a case where light-emitting elements corresponding to low beams Lo-1 to Lo-20 have lighted up in the illumination apparatus.

FIG. 13A shows a light distribution 25 meters ahead of an illumination apparatus 200 based on an optical simulation in which light-emitting elements 22 corresponding to low beams Lo-1 to Lo-20 are caused to light up in the illumination apparatuses 200.

Figure 13B:
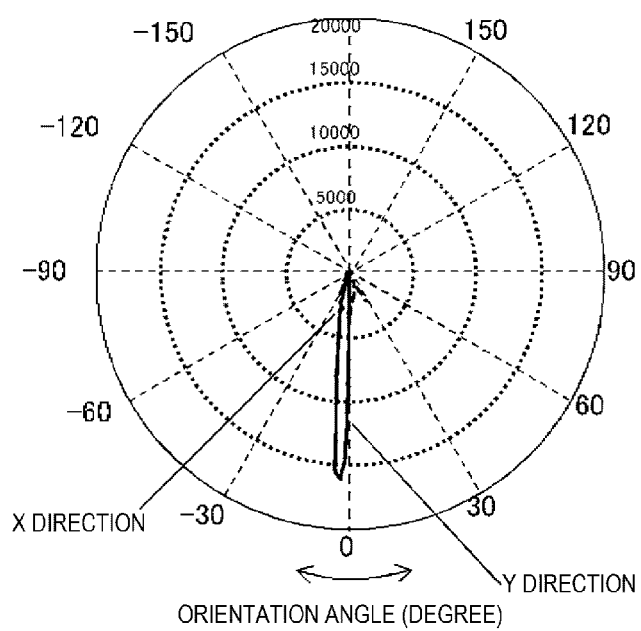
FIG. 13B is a diagram that shows a light distribution in the case shown in FIG. 13A.

FIG. 13B shows a light distribution in the lighting-up state shown in FIG. 13A. The state in which light-emitting elements 22 corresponding to low beams Lo-1 to Lo-20 are caused to light up refers to a state in which light of a passing-beam (low-beam) headlamp is generated.

In the cases of a passing-beam (low-beam) headlamp, it is required that a cutoff line Lk where the illuminance rapidly changes is provided, and, in the cases of vehicles running on the right side, it is preferable that the right side of the center line of the cutoff line is slightly higher. In cases of vehicles running on the left side, the reverse is preferable.

In this embodiment, centers 215 of optical axes of the second lenses 211 that form a passing-beam (low-beam) headlamp are located in respective positions close to lower lines of radiation ports 206 of the first lens 201, thereby forming a cutoff line Lk where the illuminance is rapidly shifted to an upper side of the illuminance distribution, as shown in FIG. 13A.

Furthermore, since shift amounts dx of centers 215 of optical axes of second lenses 211 with respect to respective centers 207 of radiation ports of first lenses 201 in the X direction gradually vary, light beams that are emitted from the second lenses 211 are combined, thus forming a zonal high illuminance region in the central portion.

<Results of Optical Simulation: High Beams Hi>

Figure 14A:
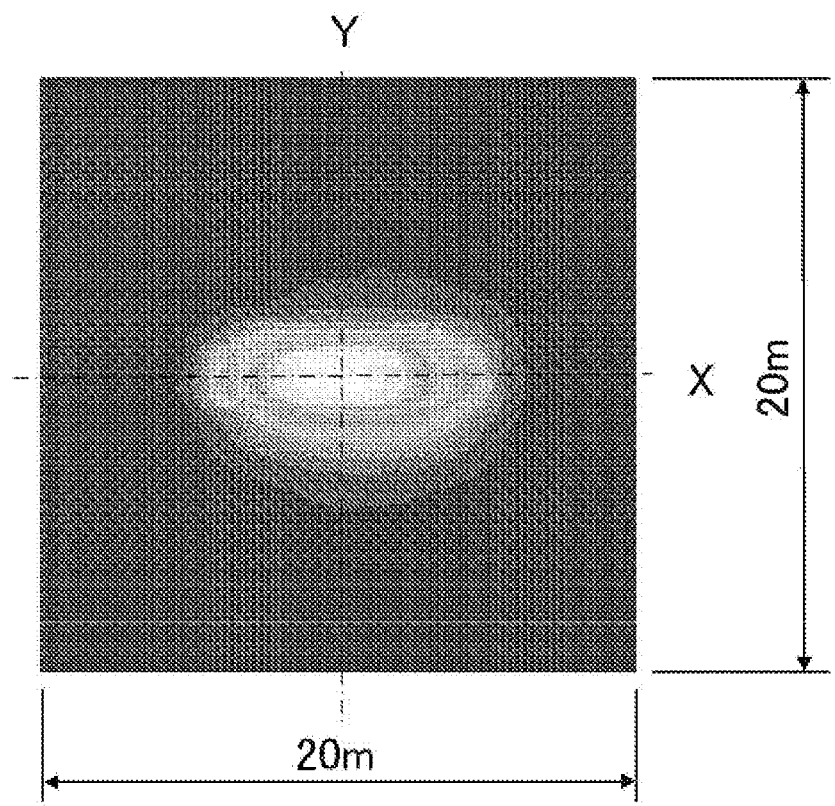
FIG. 14A a diagram that shows a light distribution 25 meters ahead of an illumination apparatus according to the first embodiment in a case where light-emitting elements corresponding to high beams Hi-1 to Hi-20 have lighted up in the illumination apparatus.

FIG. 14A shows a light distribution 25 meters ahead of the illumination apparatus 200 based on an optical simulation in which light-emitting elements 22 corresponding to high beams Hi-1 to Hi-20 are caused to light up in the illumination apparatus 200.

Figure 14B:
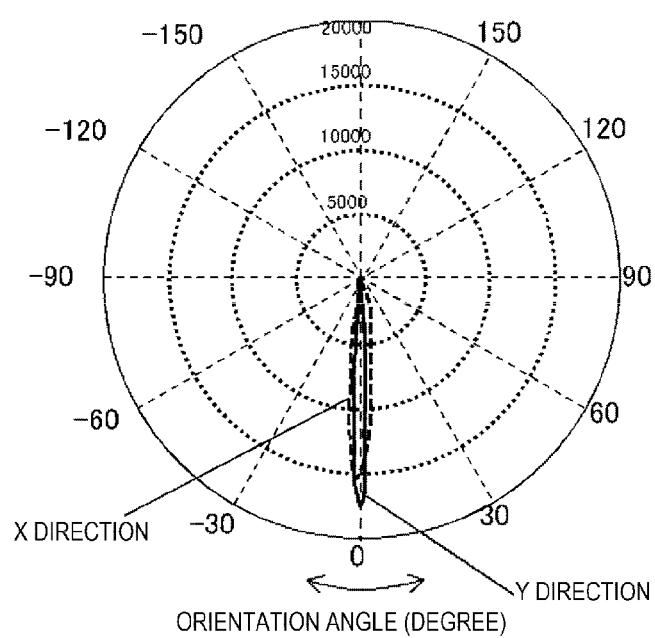
FIG. 14B is a diagram that shows a light distribution in the case shown in FIG. 14A.

FIG. 14B shows a light distribution in the lighting-up state shown in FIG. 14A. The state in which light-emitting elements 22 corresponding to high beams Hi-1 to Hi-20 are caused to light up refers to a state in which light of a driving-beam (high-beam) headlamp has been generated.

All of the shift amounts dy of centers 215 of optical axes of second lenses 211 with respect to respective centers 207 of radiation ports 206 of first lenses 201 are equal, and are 0 mm. Additionally, shift amounts dx in the X direction are gradually varied. Accordingly, a laterally-long rectangular illuminance distribution that has a zonal high illuminance region in the central portion is obtained.

<Results of Optical Simulation: Low Beams Lo+High Beams Hi>

Figure 15A:
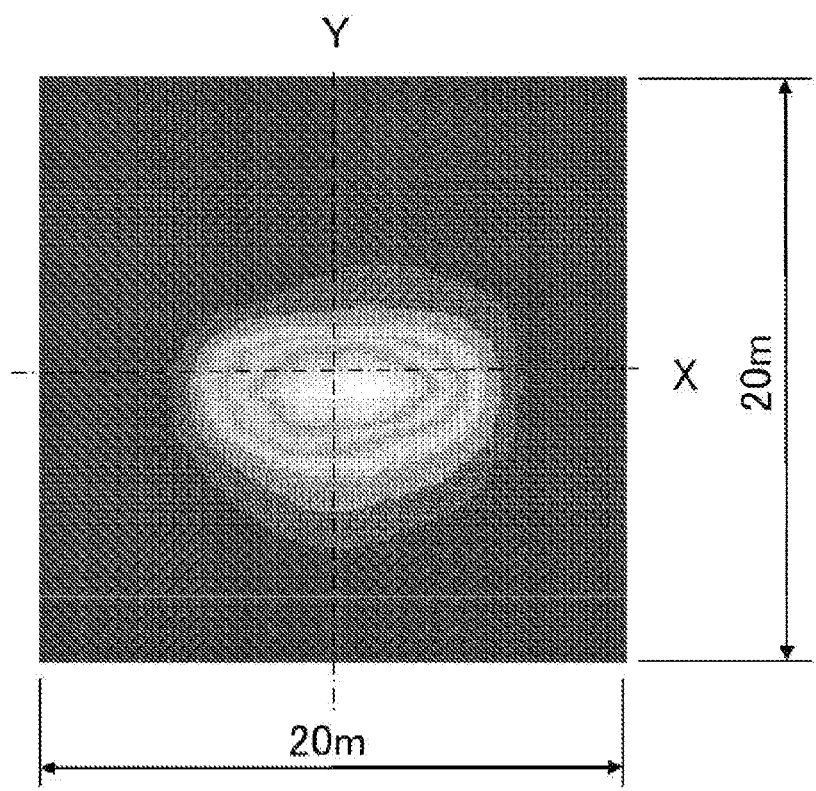
FIG. 15A a diagram that shows a light distribution 25 meters ahead of an illumination apparatus according to the first embodiment in a case where all light-emitting elements have lighted up in the illumination apparatus.
Figure 15B:
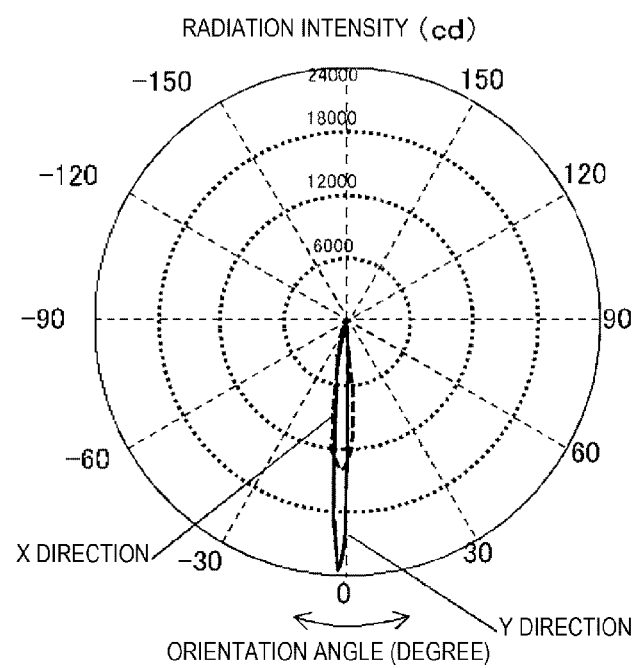
FIG. 15B is a diagram that shows a light distribution in the case shown in FIG. 15A.

FIG. 15A shows a light distribution 25 meters ahead of the illumination apparatus 200 based on an optical simulation in which all light-emitting elements 22 are caused to light up in the illumination apparatus 200. FIG. 15B shows a light distribution in the lighting-up state shown in FIG. 15A.

For a driving-beam (high-beam) headlamp, all LEDs may be caused to light up in this way. In this case, the illuminance distribution expands to the upward and downward directions, and the maximum illuminance will be higher.

<Cases in which there is a Positional Gap Between the Radiation Port 206 of the First Lens 201 and the Center 215 of the Optical Axis of the Second Lens 211>

Next, changes in light distribution characteristics in association with changes in a shift amount between a center 207 of radiation port of first lens 201, and a center 215 of optical axis of second lens 211 will be described with reference to FIGS. 16A to 18B.

Figure 16A:
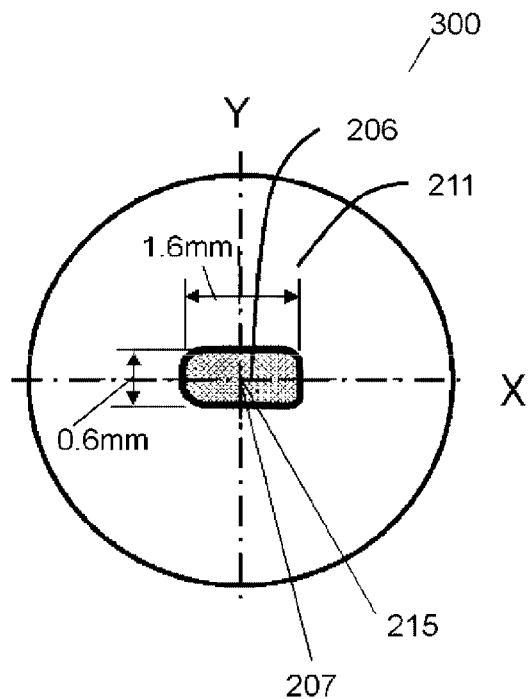
FIG. 16A is a diagram that shows a positional relationship between a radiation port of a first lens and a corresponding second lens in one illumination unit in which a center point of the radiation port of the first lens, and a center of an optical axis of the second lens are identical.

FIG. 16A is diagram of a positional relationship between the radiation port 206 and the second lens 211 in an illumination unit 300 in which the center 207 of the radiation port and the center 215 of the optical axis of the second lens 211 agree with each other, when viewed from the side where the light-emitting element 22 is present.

Figure 16B:
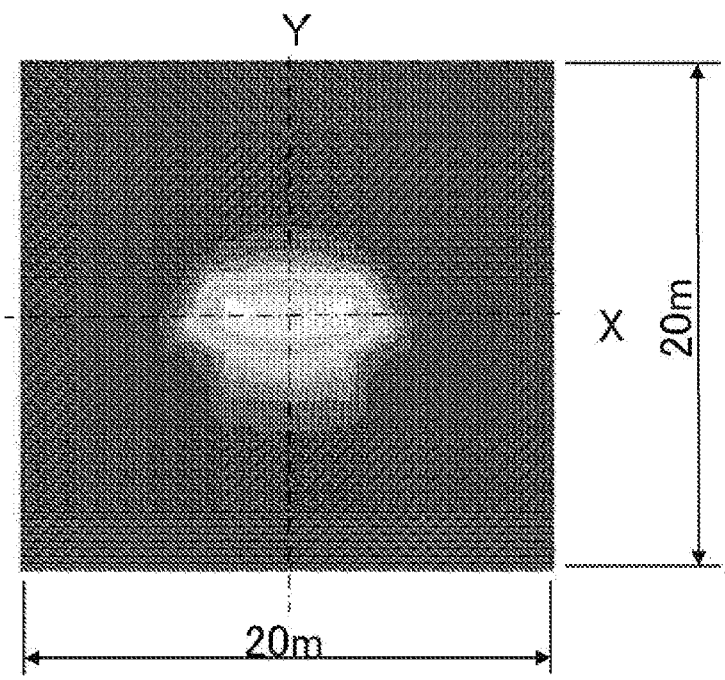
FIG. 16B is a diagram that shows a light distribution 25 meters ahead of the illumination apparatus based on the model in FIG. 16A.

FIG. 16B shows a light distribution that is a distribution of light radiated from the illumination unit 300 shown in FIG. 16A and that is present 25 meters ahead of the illumination apparatus 300. FIG. 16C shows a light distribution of the light shown in FIG. 16B.

FIG. 17A shows changes in light distribution characteristics in the X direction in a case in which the second lens 211 is shifted to a position 0.8 mm away to the right direction (x-plus direction) in increments of 0.2 mm in the illumination unit 300 shown in FIG. 16A.

Figure 17B:
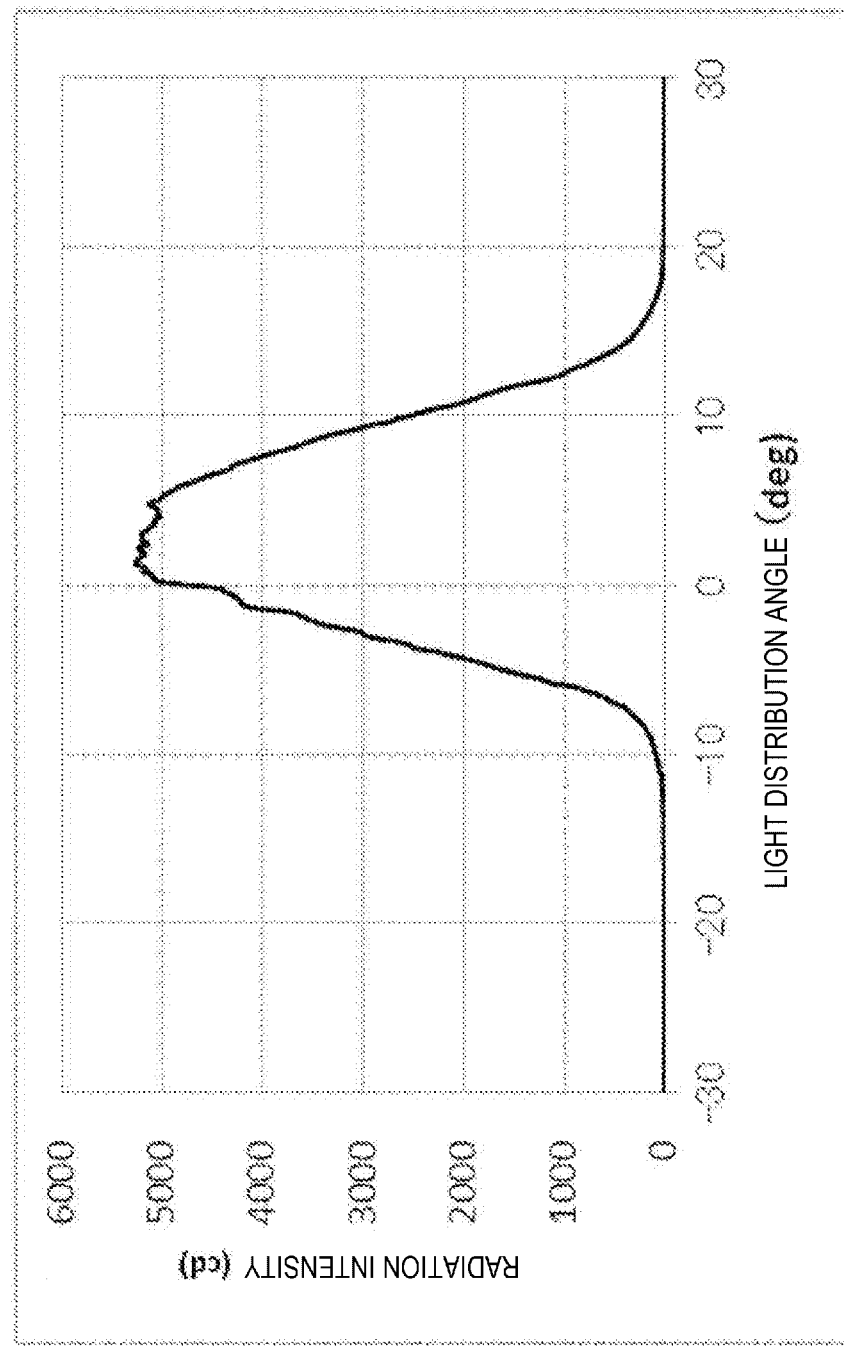
FIG. 17B is a diagram that shows light distribution characteristics with regard to a sum of light distributions in FIG. 17A.

FIG. 17B shows light distribution characteristics of a sum of light distributions shown in FIG. 17A.

Figure 18A:
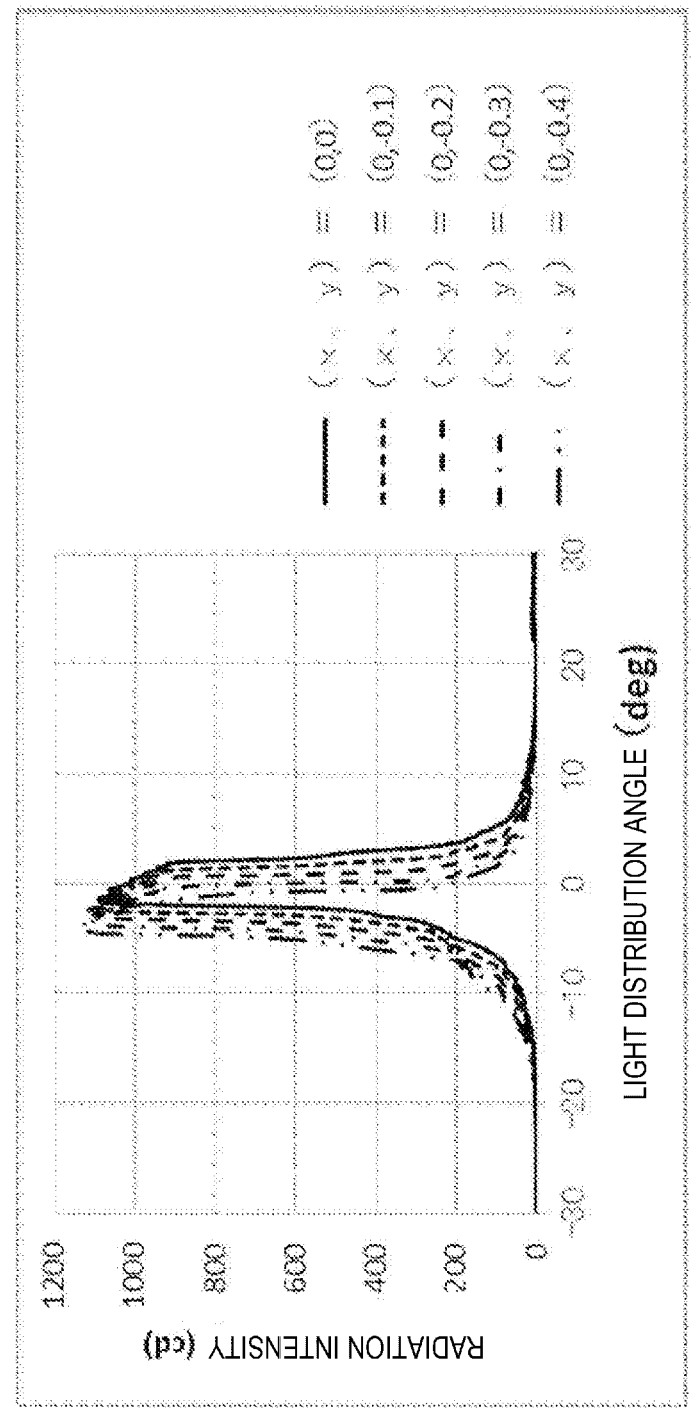
FIG. 18A is a diagram that shows changes in light distribution characteristics in the x direction in a case where the second lens is moved to a point 0.4 mm away in the downward direction (y-minus direction) in increments of 0.1 mm in the illumination unit relating to FIGS. 16A to 16C.

FIG. 18A changes in light distribution characteristics in the y direction in a case in which the second lens 211 is shifted to a position 0.4 mm away to the downward direction (y-minus direction) in increments of 0.1 mm in the illumination unit 300 shown in FIG. 16A.

Figure 18B:
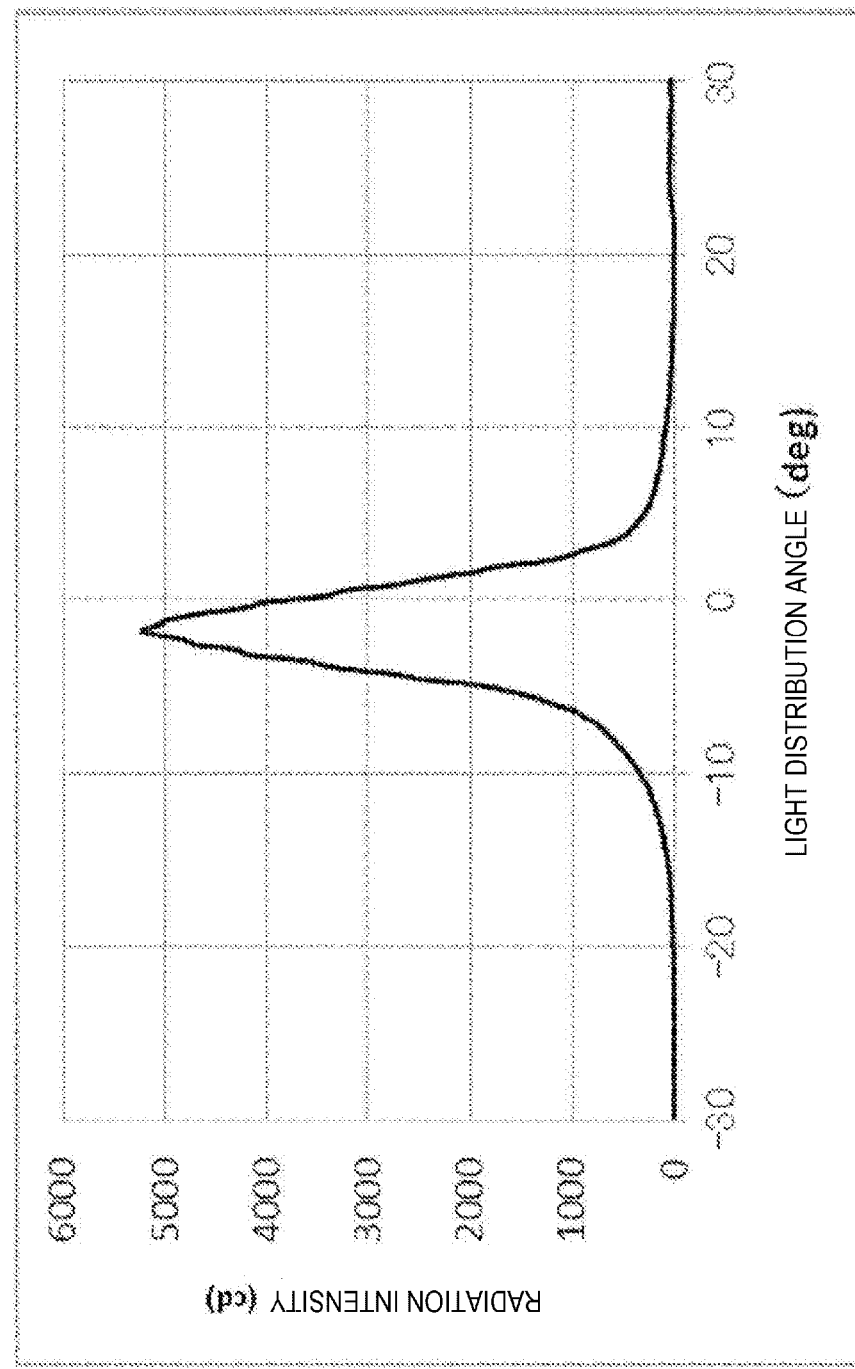
FIG. 18B is a diagram that shows light distribution characteristics with regard to a sum of light distributions in FIG. 18A.

FIG. 18B shows light distribution characteristics of a sum of light distributions shown in FIG. 18A.

As seen from FIGS. 17A and 18A, when a shift amount between the center 207 of the radiation port of the first lens 201 and the center 215 of the optical axis of the second lens 211 is varied in increments of a constant amount, the light distribution angle is also varied in increments of a constant amount.

As a result, when the shift amount d between the center 207 of the radiation port of the first lens 201 and the center 215 of the optical axis of the second lens 211 is changed by 0.1 mm, the light distribution angle is changed by about 7°. Additionally, the shape of the light distribution is also almost not changed.

As a result, when the illumination apparatus 200 is attached to a vehicle (automobile), by changing relative positions between first lenses 201 and second lenses 211 depending on the turning angle of the steering wheel, light distribution directions can be changed.

The shift angle θ of the light distribution angle with respect to the shift amount d is inversely proportional to a thickness t3 of the second lens 211, as seen in Formula 7.

$$\theta = 85.3 * d/t3 \quad \text{(Formula 7)}$$

According to Formula 7, when the thickness t3 of the second lens 211 is 13 mm, and a displacement of the second lens unit 21 is 3 mm, the light distribution direction can be changed by 20°.

<Superposition of Light Beams from Multiple Illumination Units>

As shown in FIGS. 16B and 16C, when the shift amount between the center 207 of the radiation port of the first lens 201 and the center 215 of the optical axis of the second lens 211 is zero, the light distribution angle is wide, a light distribution with a dark central portion is likely to occur in light distribution characteristics in the x direction.

To the contrary, in light distribution characteristics shown in FIG. 17B, any decline of light in the central portion is not present due to superposition of light beams radiated from the respective units, and thus, an almost rectangular illuminance distribution is obtained. Therefore, in an illumination apparatus having multiple illumination units, shift amounts between the centers 207 of the radiation ports of the first lenses 201 and the centers 215 of the optical axes of the second lenses 211 are preferably placed in such a manner that they are gradually varied.

Second Embodiment

Figure 19A:
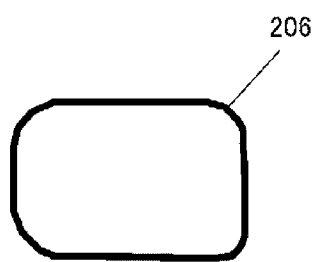
FIG. 19A is a diagram that show a shape of a radiation port in an illumination apparatus according to the first embodiment in which the illumination apparatus is configured by first lenses that have respective radiation ports having the same rectangular shape.

FIG. 19A is a plan view of the shape of the radiation port 206 in the illumination apparatus according to the first embodiment. The radiation ports 206 are formed in the same rectangular shape in all of the first lenses 201.

Figure 19B:
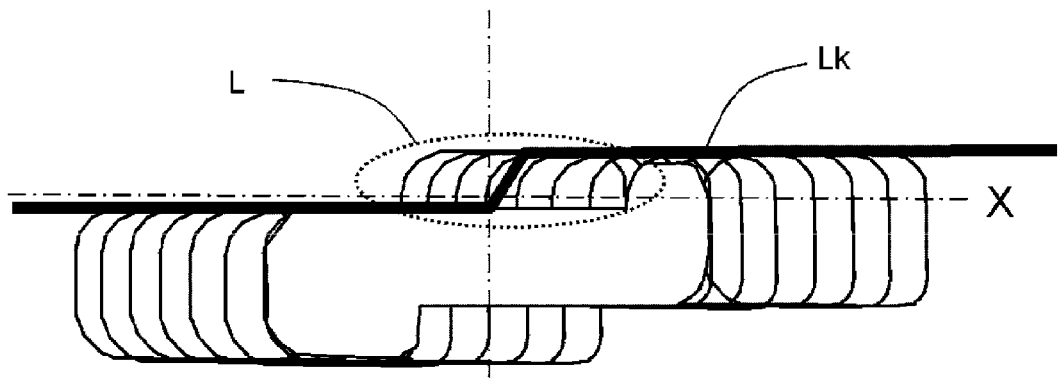
FIG. 19B is a diagram that shows level curves of an illuminance distribution of a passing beam (low beams) in an illumination apparatus according to the first embodiment.

FIG. 19B refers to level curves of an illuminance distribution with regard to the illumination apparatus according to the first embodiment. That is, FIG. 19B refers to level curves of an illuminance distribution of a passing-beam (low-beam) in a case where second lenses 211 are placed in accordance with the positional relationship of low beams Lo-1 to Lo-20 shown in FIG. 11B.

In this case, within an area in which the cutoff line Lk changes obliquely at an angle, a region L in which changes in the illuminance in the x direction become mild and the cutoff line is unclear may be caused.

Figure 20A:
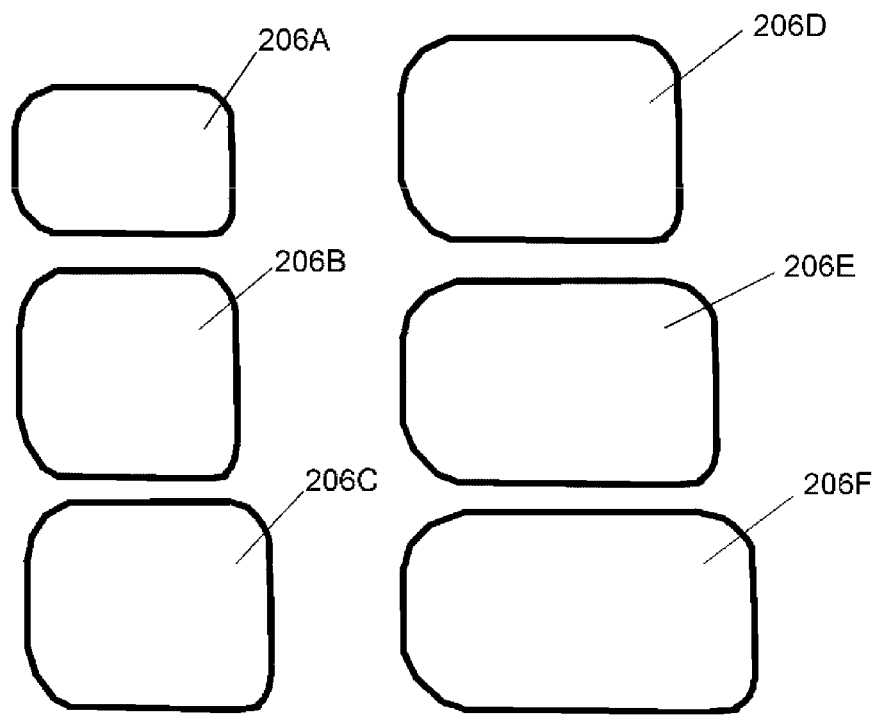
FIG. 20A is a diagram that show shapes of radiation ports in an illumination apparatus according to a second embodiment in which the illumination apparatus is configured by first lenses that have respective radiation ports having different shapes.

This embodiment is one example of solution to the above problem. Hereinafter, with reference to FIGS. 20A and 20B, this embodiment will be described. FIG. 20A is a plan view showing that there are multiple types of shapes of radiation ports of first lenses 201. That is, one illumination apparatus has multiple types of radiation ports 206A to 206F.

The illumination apparatus in this embodiment has 20 illumination units 300. The first lens 201 has 6 types of radiation ports 206A to 206F. In positions No. 1 to No. 20, second lenses 211 are placed based on the positional relationship of low beams Lo-1 to Lo-20 shown in FIG. 11B.

In twelve positions of Nos. 1 to 12, first lenses 201 each have a radiation port 206A. In three positions of Nos. 13, 19 and 20, first lenses 201 each have a radiation port 206B that is 0.2 mm longer than the radiation port 206A toward the downward direction. In No. 14, the first lens 201 has a radiation port 206C that is 0.1 mm longer than the radiation port 206B toward the right direction. In No. 15, the first lens 201 has a radiation port 206D that is 0.1 mm longer than the radiation port 206C toward the right direction. In No. 16, the first lens 201 has a radiation port 206E that is 0.1 mm longer than the radiation port 206D toward the right direction. In No. 17, the first lens 201 has a radiation port 206F that is 0.1 mm longer than the radiation port 206E toward the right direction.

Figure 20B:
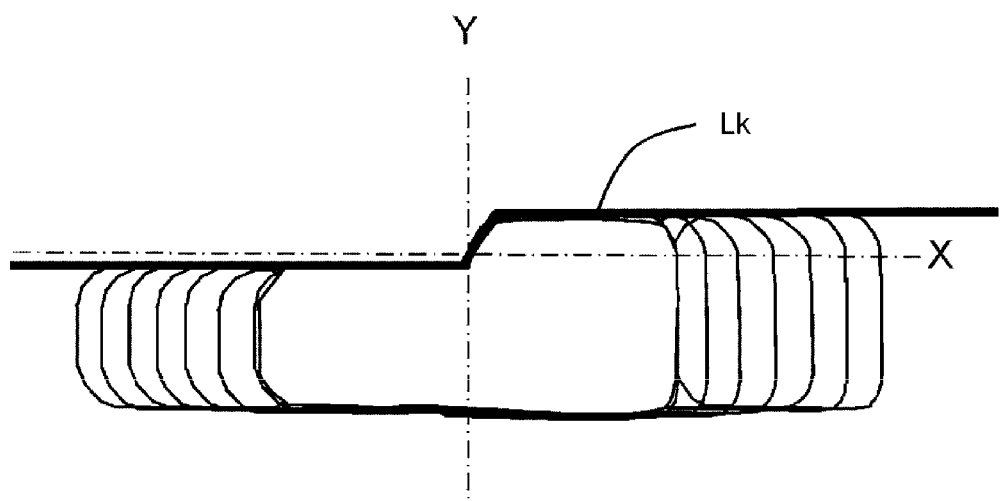
FIG. 20B is a diagram that shows level curves of an illuminance distribution of a passing beam (low beam) in an illumination apparatus according to the second embodiment.

FIG. 20B shows level curves of an illuminance distribution with regard to the illumination apparatus according to this embodiment. That is, FIG. 20B refers to level curves of an illuminance distribution of a passing-beam (low-beam) in a case where centers 207 of radiation ports of first lenses 201 and corresponding centers 215 of optical axes of second lenses 211 in Nos. 1 to 20 are placed on the condition that each of shift amounts between them is 0.1 mm in the x direction.

In the illumination apparatus according to this embodiment, a clear cutoff line Lk is obtained over the entire region, and any unclear region L as seen in FIG. 19B is not present. That is, a clear cutoff line Lk as seen in FIG. 20B can be formed by using multiple first lenses 201 that have respective radiation ports 206A to 206F having different shapes as shown in FIG. 20A. In addition, matters not described in this embodiment are the same as the first embodiment.

Third Embodiment

Although the shape of the radiation port 206 of the first lens 201 are rectangular in the first and second embodiments, the shape may be a shape formed by deleting a part of any one of the followings: quadrangle, ellipse, semicircle, and semi-ellipse. It is possible to form any illuminance distributions with unlimited shapes based on combinations of these shapes.

The first and second embodiments can be combined.
<Configuration Base on Free Design>

In the first and second embodiments, shift amounts of the centers 215 of optical axes of second lenses 211 with respect to the centers 207 of radiation ports of first lenses 201 are gradually varied in the arrayed order. However, they may be varied not in such an arrayed order but in random order.

Furthermore, light-emitting elements 22 are placed in two rows at regular intervals. However, they may be placed in the other ways. For example, they may be placed in a circular shape, an S-shape, or any other geometric configurations.

By varying the lengths of first lenses 201 with locations, it also becomes possible to sterically place the illumination apparatuses 200 in a state in which the light-emitting elements 22 are mounted on a plan substrate 23.

Figure 21:
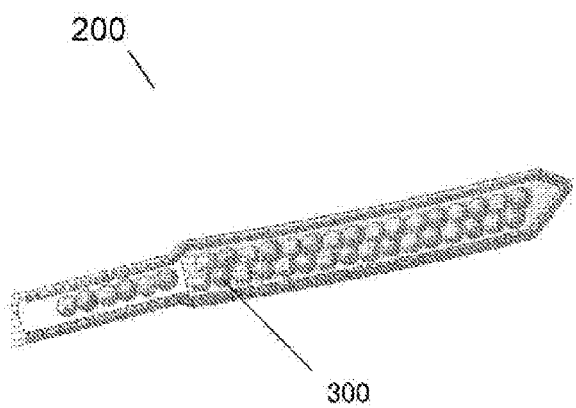
FIG. 21 is a perspective view of an illumination apparatus according to a third embodiment in which arrays of illumination units and directions of LEDs are designed without any limitation.

FIG. 21 is a partial front view of an illumination apparatus 200. The illumination apparatus 200 shown in FIG. 21 has a region in which lenses are placed in 2 row, and a region in which lenses are placed in 1 row. In ways of arraying illumination units 300, there is a certain degree of freedom, and free design is possible. In that case, it is only necessary to satisfy the relationships between the first lenses 201 and the second lenses 211 that are described in the first and second embodiments.

Furthermore, although the multiple first lenses 201 and the multiple second lenses 211 are identical to one another in the first and second embodiments, their sizes and/or the like can be varied. Multiple types of light sources can be combined to form an illumination apparatus. In this configuration, it is possible to radiate sufficient light even when any defects are caused in a part of the light-emitting elements 22.

As described above, it is possible to change the directions of optical axes of light-emitting elements 22 with respect to the direction of the optical axis of the illumination apparatus in a non-restrictive manner, and multiple lens units can be placed without no limitations. Furthermore, since the lump is configured by combining multiple light sources, it is possible to radiate sufficient light even when any defects are caused in apart of the light-emitting elements 22.

Fourth Embodiment

Hereinafter, with reference to FIGS. 22A to 23G, the fourth embodiment will be described. In the first to third embodiments, multiple lens units are used. To the contrary, a pair of lenses is used in illumination apparatuses 500 and 600 according to this embodiment.

Figure 22A:
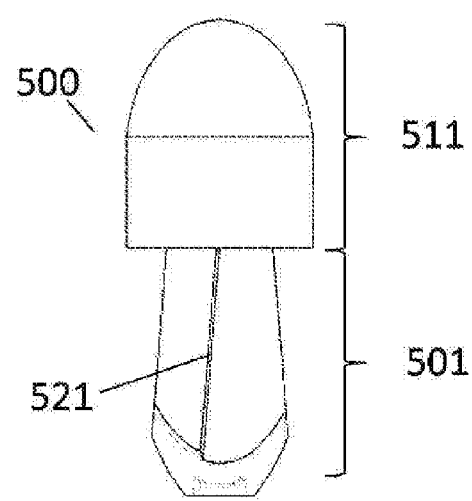
FIG. 22A is a lateral view of an illumination apparatus according to a fourth embodiment.
Figure 22B:
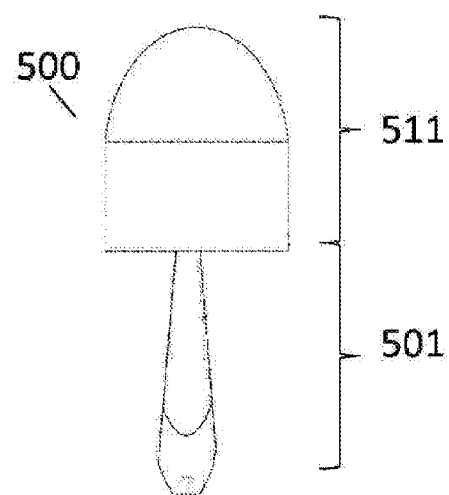
FIG. 22B is another lateral view of the illumination apparatus shown in FIG. 22A.

FIGS. 22A and 22B are lateral views of the illumination apparatus 500. The illumination apparatus 500 has a first lens 501 and a second lens 511. Although a light-emitting element 22 is located below the first lens 501, it is not seen in the figures.

Figure 22C:
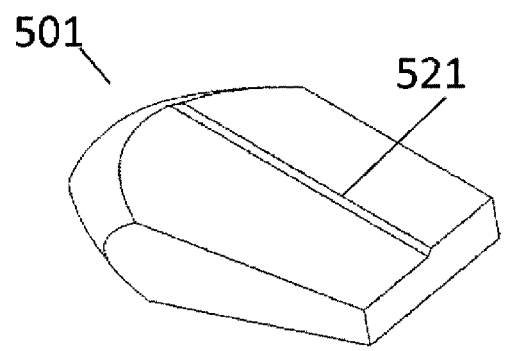
FIG. 22C is a perspective view of a first lens in the illumination apparatus shown in FIG. 22A.

FIG. 22C is a perspective view of the first lens 501. On the first lens 501, provided is a step 521 that extends from the top to the bottom of the lateral surface.

Figure 22D:
FIG. 22D is a plan view of a radiation port of the first lens in the illumination apparatus shown in FIG. 22A.
Figure 22D:

FIG. 22D is a plan view that shows a radiation port 506 of the first lens 501. The radiation port 506 guides light from the first lens 501 to the second lens 511. The step 521 appears on the long side of the radiation port 506.

Figure 22E:
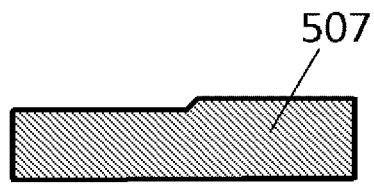
FIG. 22E is a diagram that shows a light-radiation region caused by the illumination apparatus shown in FIG. 22A.

FIG. 22E shows a light-radiation range 507 of light according to the illumination apparatus 500. There is a step within the light-radiation range 507. In the light-radiation range 507, a low-beam light distribution will appear, and the light-radiation range 507 exhibits a shape similar to the shape of the radiation port 506.

One feature of the illumination apparatus 500 is the presence of the step 521 on the side surface of the first lens 501 as described above. An edge of the step 521 is also located on the radiation port 506.

The illumination apparatus 500 can achieve a low-beam light distribution based on the pair of the first lens 501 and the second lens 511. For a high-beam illumination apparatus, another illumination apparatus can be used.

Furthermore, multiple illumination apparatuses 500 may be used. Matters other than the above-mentioned matters are the same as the first to third embodiments.

Next, with reference to FIGS. 23A to 23G, an illumination apparatus 600, which is a variation example of the illumination apparatus 500, will be described.

Figure 23A:
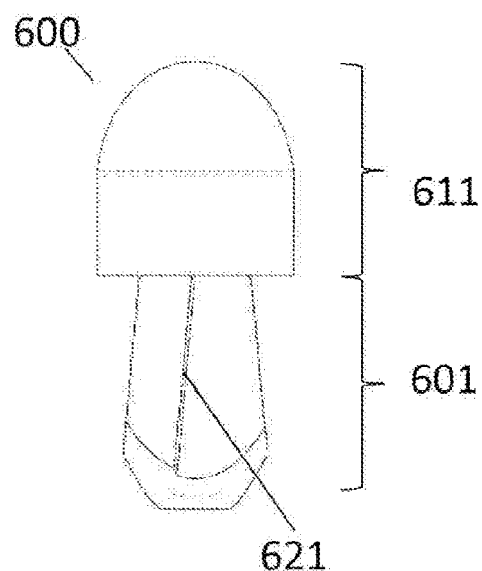
FIG. 23A is a lateral view of an illumination apparatus according to the fourth embodiment.
Figure 23B:
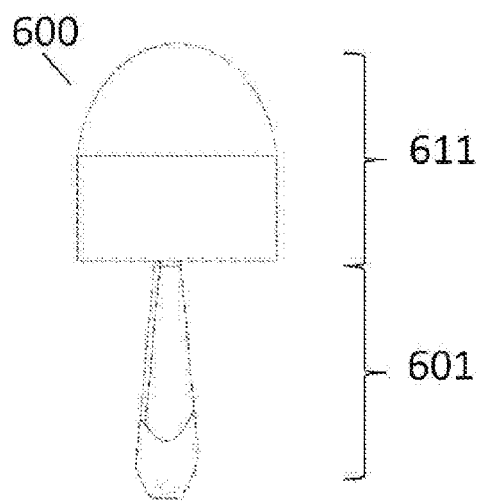
FIG. 23B is another lateral view of the illumination apparatus shown in FIG. 23A.

FIGS. 23A and 23B are lateral views of the illumination apparatus 600. The illumination apparatus 600 has a first lens 601 and a second lens 611. Although a light-emitting element 22 is present below the first lens 601, it is not seen in the figures.

Figure 23C:
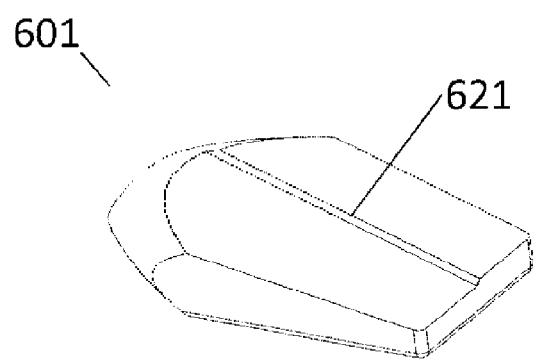

FIG. 23C is a perspective view of the first lens 601. On the first lens 601, provided is a step 621 that extends from the top to the bottom of the side surface.

Figure 23D:
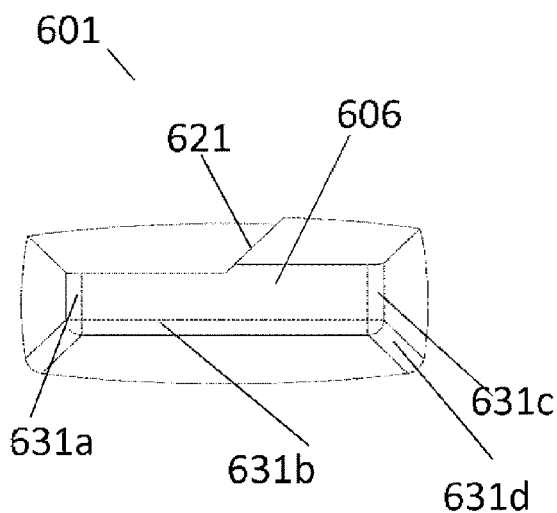
FIG. 23D is a plan view of a radiation port of the first lens in the illumination apparatus shown in FIG. 23A.

FIG. 23D is a plan view that shows a radiation port 606 of the first lens 601. The radiation port 606 guides light from the first lens 601 to the second lens 611. The step 621 appears on the long side of the radiation port 606.

Figure 23E:
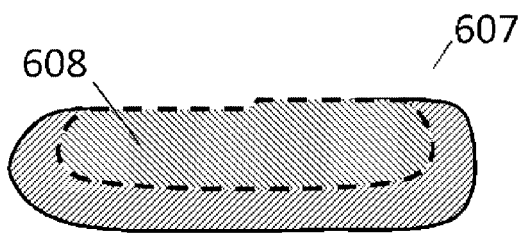
FIG. 23E is a diagram that shows a light-radiation region caused by the illumination apparatus shown in FIG. 23A.

FIG. 23E shows a light-radiation range 607 according to the illumination apparatus 600. In the light-radiation range 607, a low-beam light distribution will appear, and the light-radiation range 607 corresponds to the shape of the radiation port 606.

As for a difference between the illumination apparatus 600 and the illumination apparatus 500, there are tapered parts 631a, 631b, 631c and 631d in a peripheral part of the radiation port 606 in the illumination apparatus 600, as seen from FIG. 23D.

The tapered part 631a is formed on the left-side corner of the radiation port 606. The tapered part 631b is formed on the lower-side corner of the radiation port 606. The tapered part 631c is formed on the right-side corner of the radiation port 606. There is no tapered part on the remaining one side of the radiation port 606. The tapered parts 631d are formed on the corners of the side surface of the first lens 601.

Figure 23F:
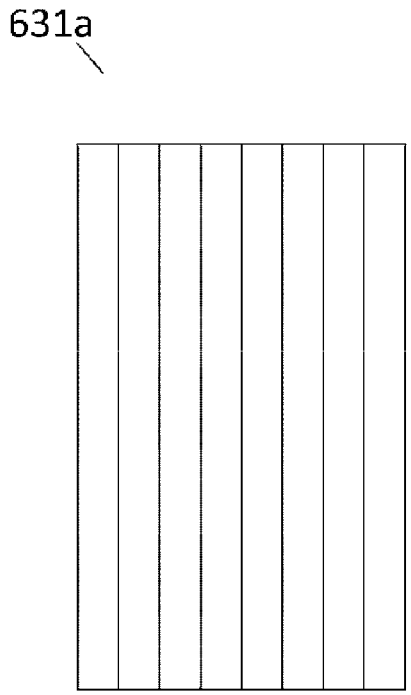
FIG. 23F is an enlarged plan view of a taper part shown in FIG. 23D.
Figure 23G:
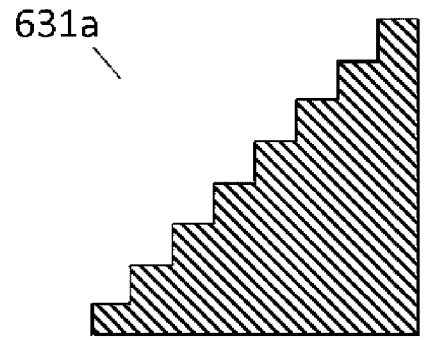
FIG. 23G is a cross-section view of the taper part shown in FIG. 23D.

FIG. 23F is an enlarged plan view of the taper part 631a. FIG. 23G is a cross-section view of the taper part 631a. According to such a stair-like shape as shown in the figures, light will be diffused. As understood from comparison between FIGS. 22E and 23E, the peripheral portion of the irradiation range 607 is broadened (blurred). Thus, the light-radiation range 607 is broader than the light-radiation range 507. The low-beam part 608 is clear, and, in peripheral parts other than the low-beam part 608, the light is broadened and blurred.

Fifth Embodiment

Figure 24B:
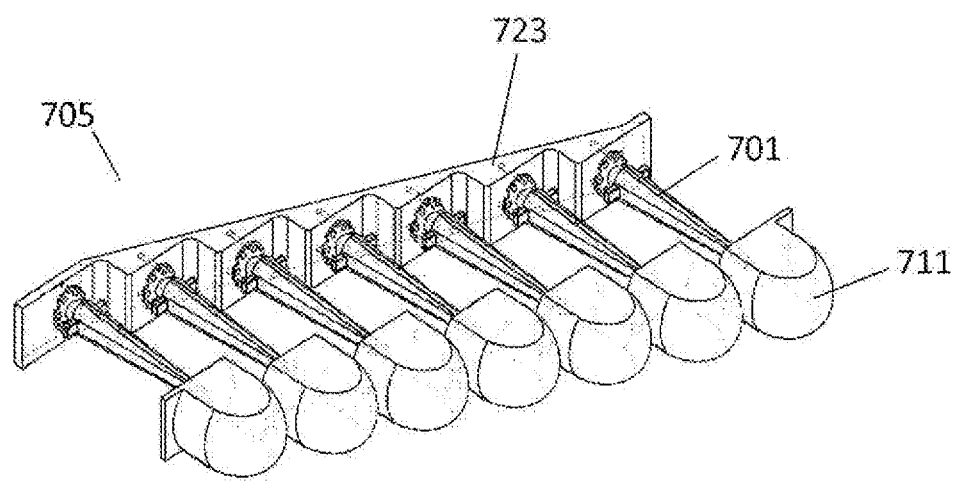
FIG. 24B is a perspective view of the illumination apparatus shown in FIG. 24A.
Figure 25A:
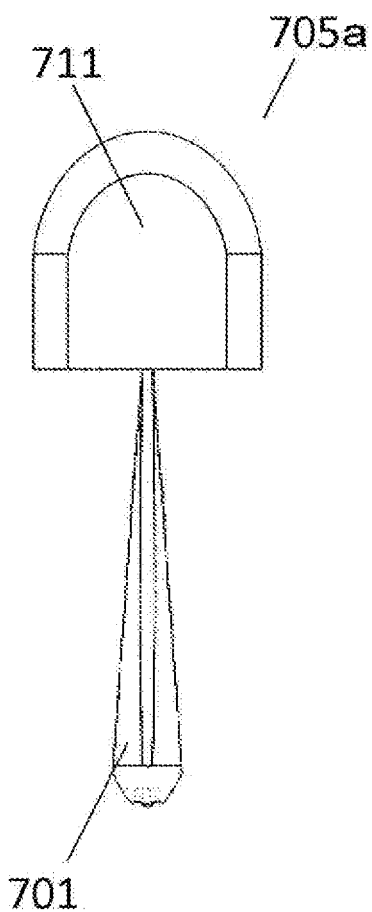
FIG. 25A is a lateral view of one lens unit in the illumination apparatus shown in FIG. 24A.
Figure 25B:
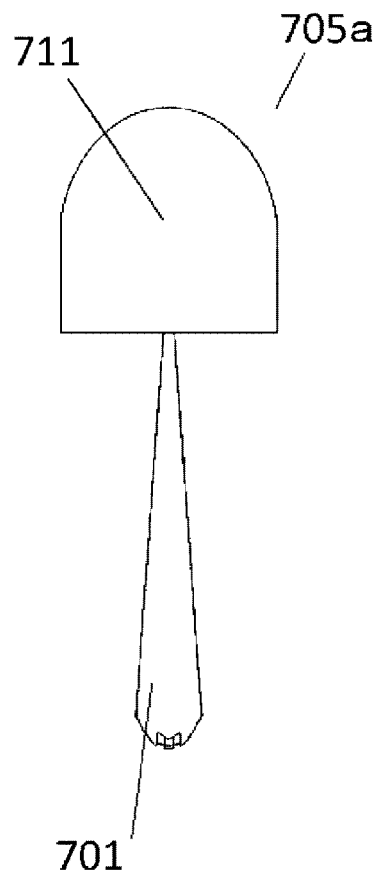
FIG. 25B is another lateral view of the lens unit shown in FIG. 25A.
Figure 25C:
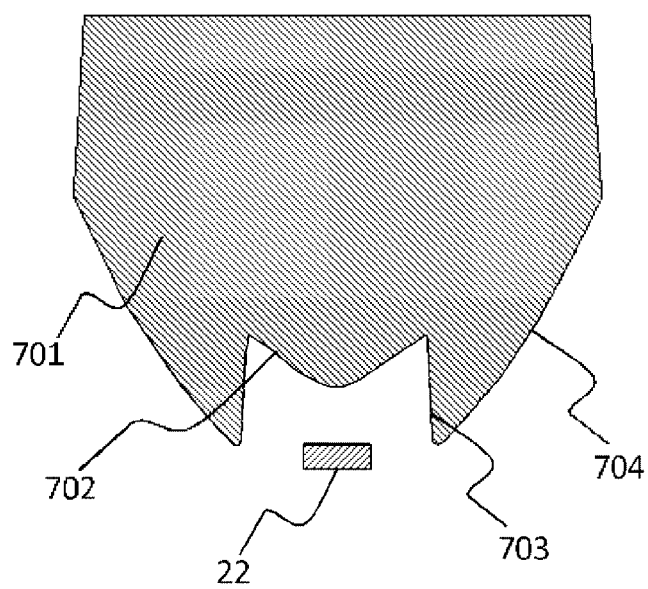
FIG. 25C is an enlarged cross-section view of a lower part of the first lens in the lens unit shown in FIG. 25A.
Figure 26A:
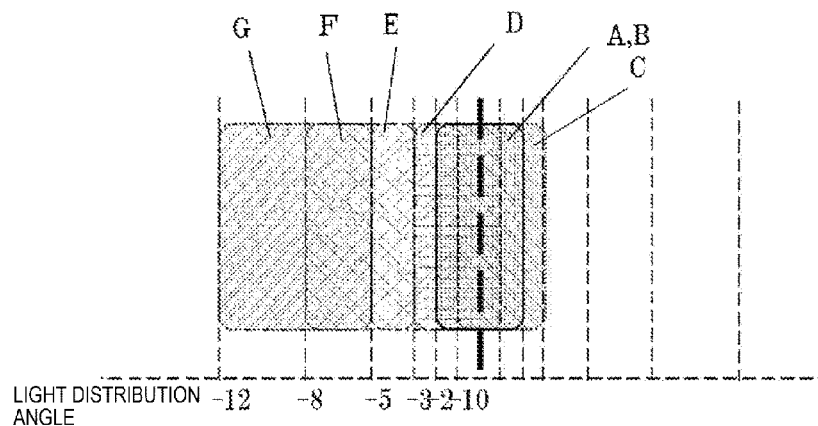
FIG. 26A is a diagram that shows a light distribution relating to a left-side illumination unit in the illumination apparatus shown in FIG. 24A.
Figure 26B:
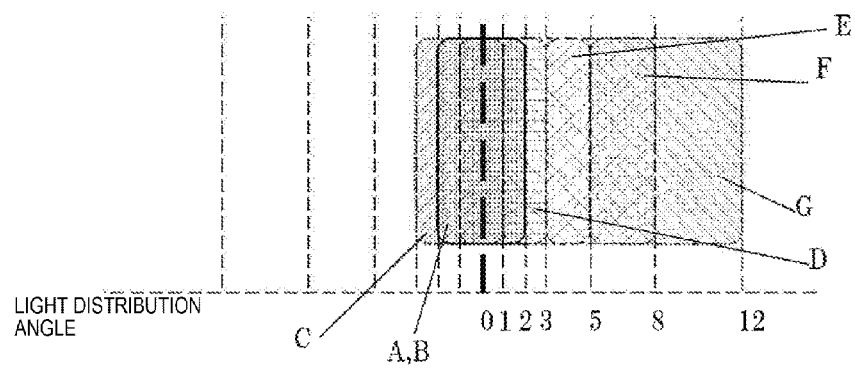
FIG. 26B is a diagram that shows a light distribution relating to a right-side illumination unit in the illumination apparatus shown in FIG. 24A.
Figure 27A:
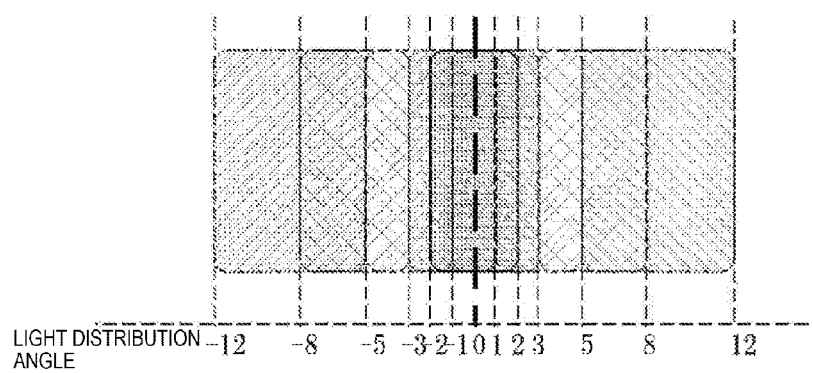
FIG. 27A is a diagram that shows a distribution of combined light from the left-side and right-side illumination units shown in FIGS. 26A and 26B, respectively.
Figure 27B:
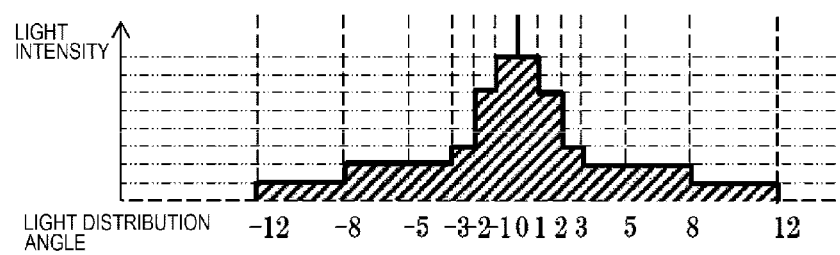
FIG. 27B is a diagram that shows a light-intensity distribution of the combined light shown in FIG. 27A.
Figure 28A:
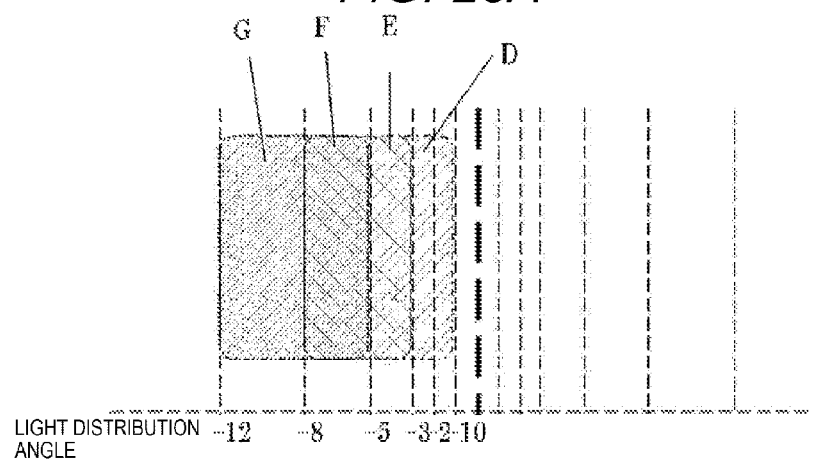
FIG. 28A is a diagram that shows another light distribution relating to the left-side illumination unit in the illumination apparatus shown in FIG. 24A.
Figure 28B:
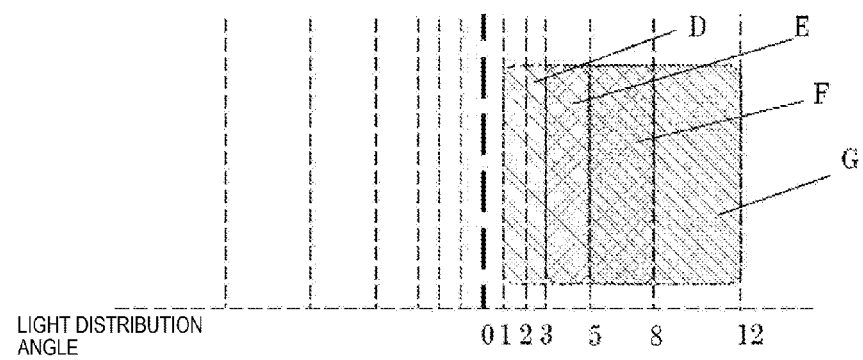
FIG. 28B is a diagram that shows another light distribution relating to the right-side illumination unit in the illumination apparatus shown in FIG. 24A.
Figure 29A:
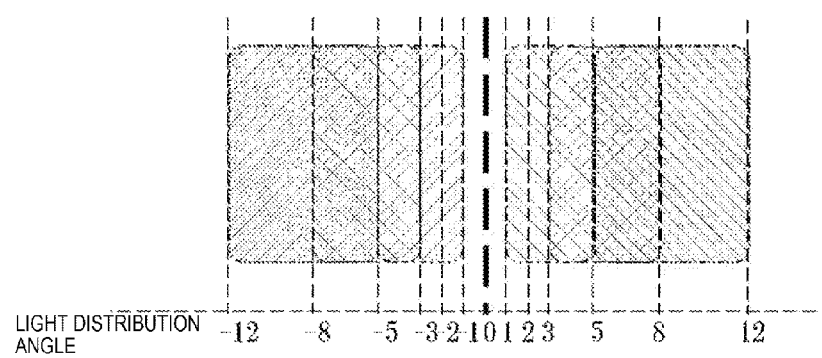
FIG. 29A is a diagram that shows a distribution of combined light from the left-side and right-side illumination units shown FIGS. 28A and 28B, respectively.
Figure 29B:
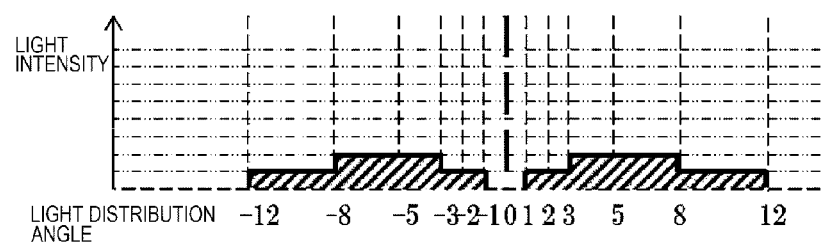
FIG. 29B is a diagram that shows a light-intensity distribution of the combined light shown in FIG. 29A.
Figure 30A:
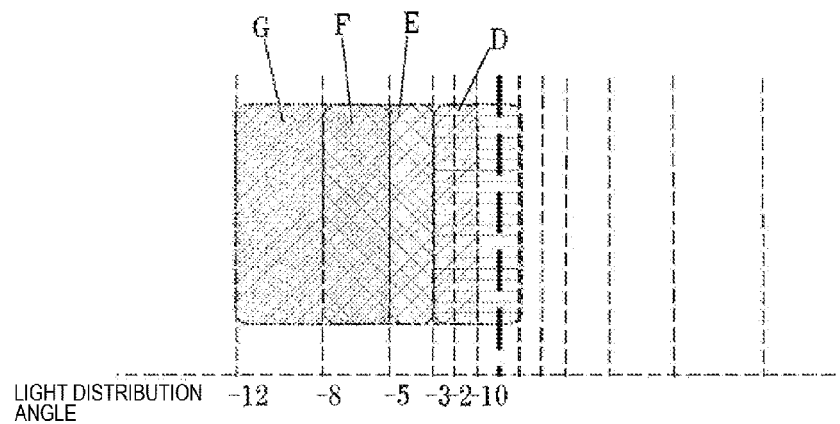
FIG. 30A is a diagram that shows still another light distribution relating to the left-side illumination unit in the illumination apparatus shown in FIG. 24A.
Figure 30B:
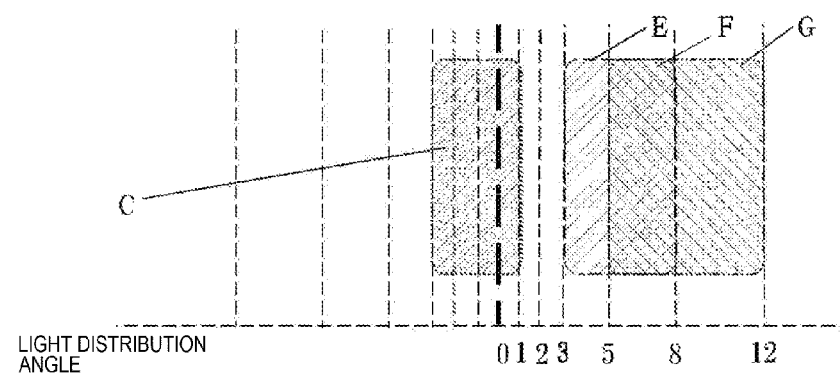
FIG. 30B is a diagram that shows still another light distribution relating to the right-side illumination unit in the illumination apparatus shown in FIG. 24A.
Figure 31A:
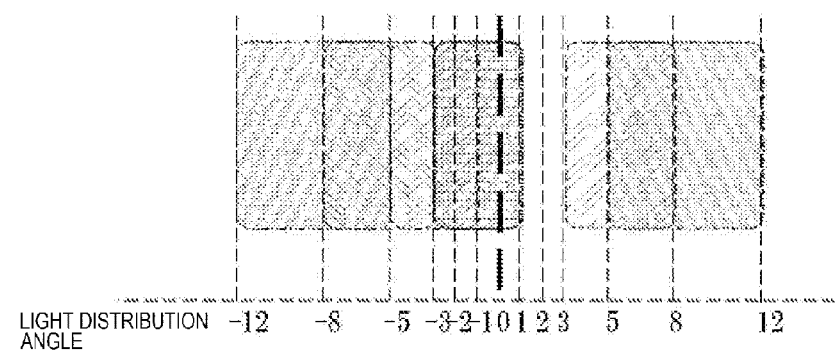
FIG. 31A is a diagram that shows a distribution of combined light from the left-side and right-side illumination units shown FIGS. 30A and 30B, respectively.
Figure 31B:
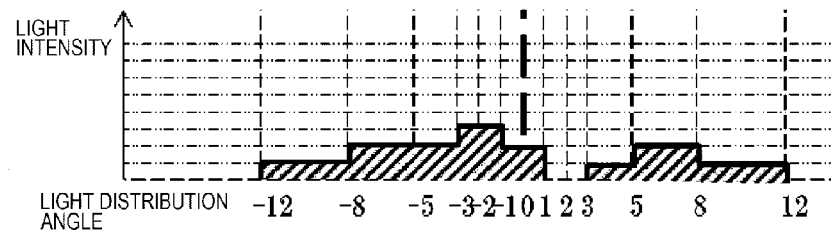
FIG. 31B is a diagram that shows a light-intensity distribution of the combined light shown in FIG. 31A.
Figure 32A:
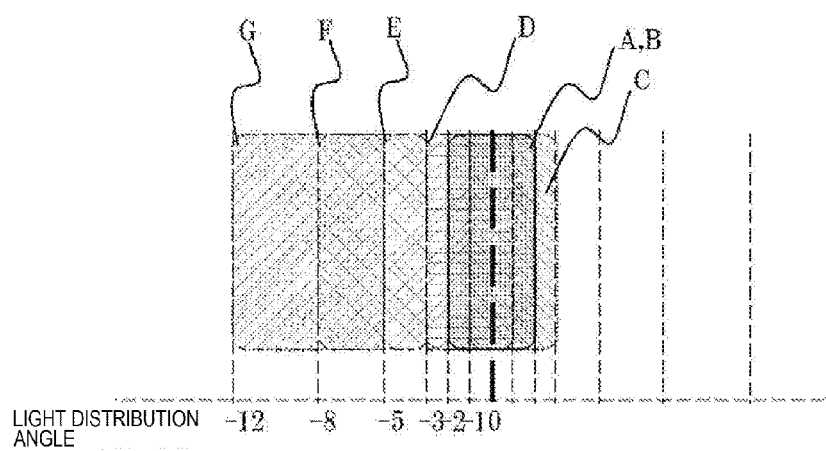
FIG. 32A is a diagram that shows still another light distribution relating to the left-side illumination unit in the illumination apparatus shown in FIG. 24A.
Figure 32B:
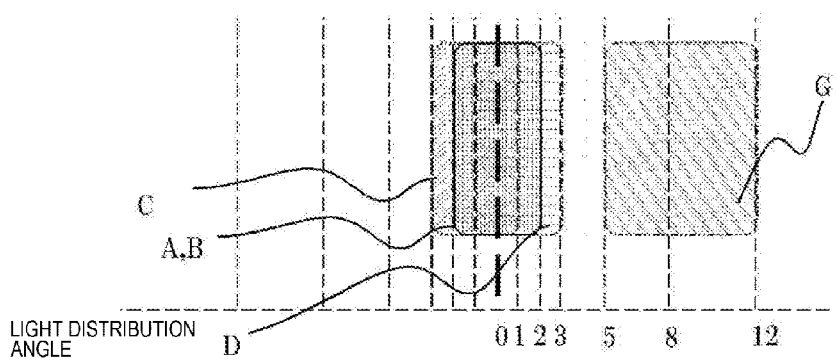
FIG. 32B is a diagram that shows still another light distribution relating to the right-side illumination unit in the illumination apparatus shown in FIG. 24A.
Figure 33A:
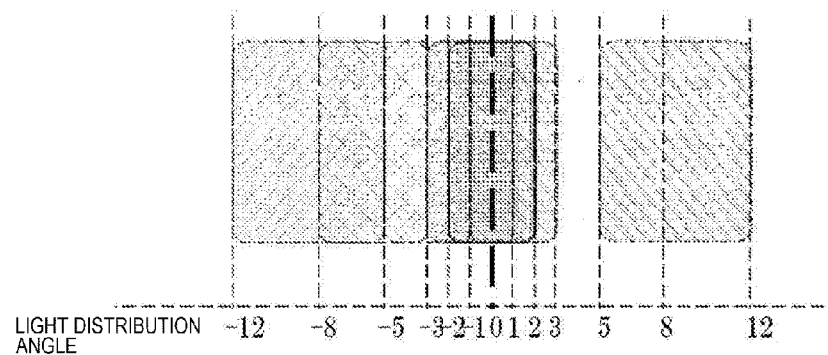
FIG. 33A is a diagram that shows a distribution of combined light from the left-side and right-side illumination units shown FIGS. 32A and 32B, respectively.
Figure 33B:
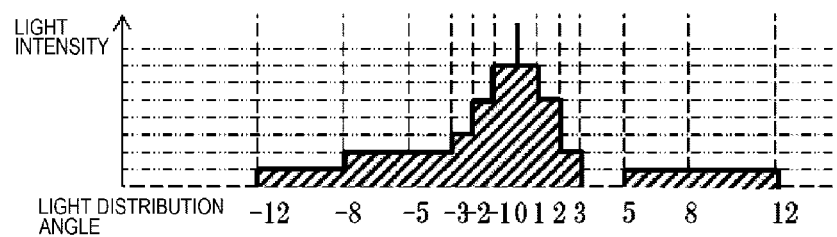
FIG. 33B is a diagram that shows a light-intensity distribution of the combined light shown in FIG. 33A.
Figure 34A:
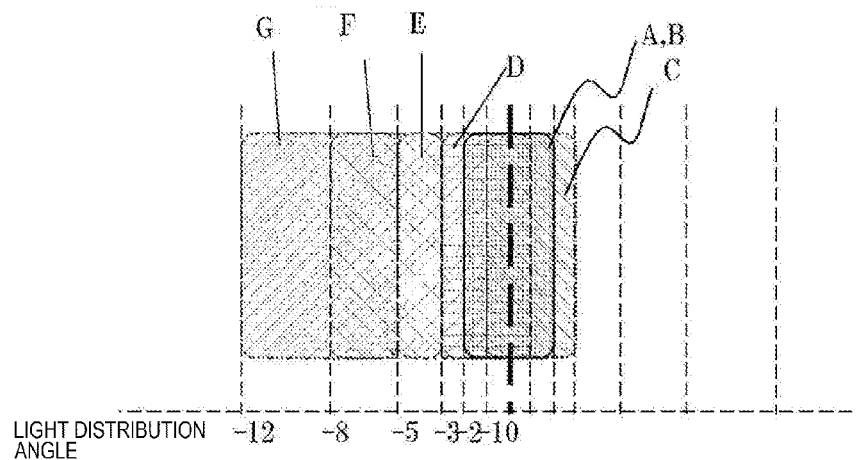
FIG. 34A is a diagram that shows still another light distribution relating to the left-side illumination unit in the illumination apparatus shown in FIG. 24A.
Figure 34B:
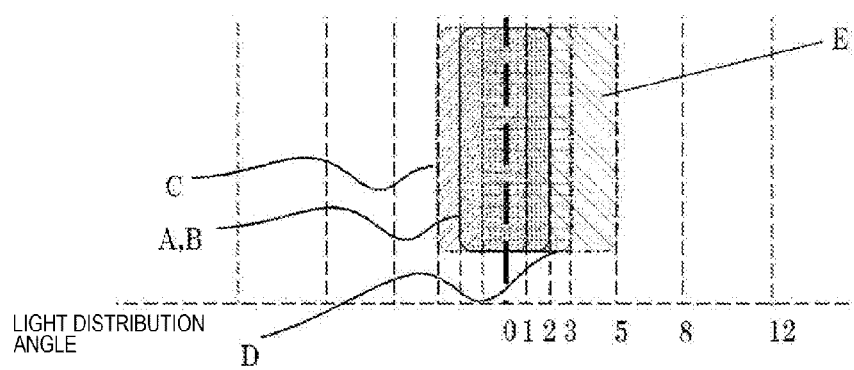
FIG. 34B is a diagram that shows still another light distribution relating to the right-side illumination unit in the illumination apparatus shown in FIG. 24A.
Figure 35A:
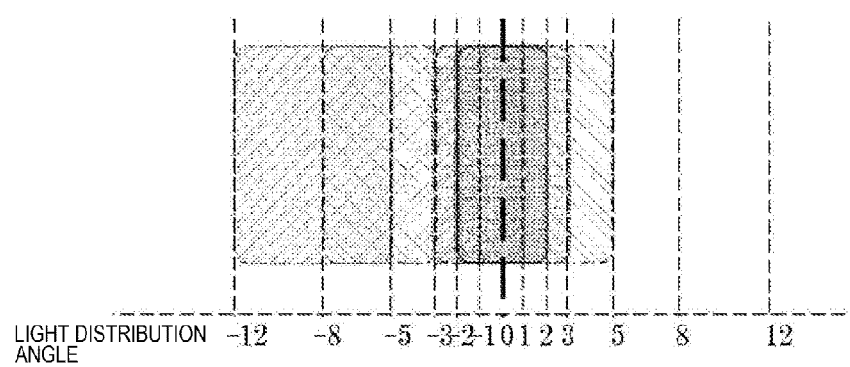
FIG. 35A is a diagram that shows a distribution of combined light from the left-side and right-side illumination units shown FIGS. 34A and 34B.
Figure 35B:
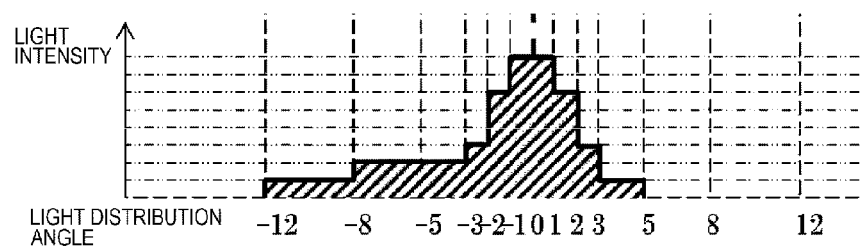
FIG. 35B is a diagram that shows a light-intensity distribution of the combined light shown in FIG. 35A.

Next, with reference to FIGS. 24A to 35B, the fifth embodiment will be described. FIG. 24A is a lateral view of an illumination apparatus 700 according to this embodiment. The illumination apparatus 700 has two illumination units 705. The two illumination units 705 are placed at the left and right sides assuming an illumination apparatus for automobiles. The illumination units 705 each have multiple lens units 705a to 705g. FIG. 24B is a lateral view of one illumination unit 705 when viewed from a direction different from FIG. 24A (from the vertical direction). FIGS. 25A and 25B are lateral views of a lens unit 705a included in the illumination units 705. The same shall apply to the other lens units. FIG. 25C is an enlarged cross-section view of a lower part of the first lens 701 in the lens unit 705a.

Differences between this embodiment and the above-described embodiments are mentioned below. Features other than the differences mentioned below are the same as the first to third embodiments.

(1) In the first to third embodiments, the substrates 23 are planar. To the contrary, the illumination apparatus 700 according to this embodiment has a stair-like substrate 723 as shown in FIGS. 24A and 24B.

(2) In the first to third embodiments, the light-emitting elements 22 are inclined with respect to the first lenses 101. To the contrary, in the illumination apparatus 700, light-emitting surfaces of light-emitting elements 22 are parallel to respective bottom surfaces (first incident surfaces 702) of the first lenses 701, as shown in FIG. 25C. As described above, since the substrate 723 has a stair-like shape, such a configuration becomes possible. Since light from the light-emitting elements 22 vertically enters the bottom surfaces of first lenses 701, the usability of light is higher.

(3) In the multiple lens units 705a to 705g, positional relationships of the first lenses 701 and the second lenses 711 are the same.

In each of the lens units 705a to 705g, a light-radiated region is predetermined. By switching on and off the light-emitting elements 22 that are placed below the respective lens units 705a to 705g, the light-radiation range can be controlled. In FIGS. 24A and 24B, units 705 each have seven lens units 705a to 705g.

FIGS. 26A to 35B show examples in which light-radiation ranges are changed by switching on and off the light-emitting elements 22 that are placed below the respective lens units 705a to 705g. Symbols A to G in the figures show light beams from lens units 705a to 705g, respectively. However, there is no relationship between the arrangement (positions) of the lens units and light-radiation positions, and a light-radiation position is set to each of the lens units.

FIGS. 26A, 28A, 30A, 32A and 34A show light distributions with regard to left-side illumination units 705. FIGS. 26B, 28B, 30B, 32B and 34B show light distributions with regards to right-side illumination units 705. FIGS. 27A, 29A, 31A, 33A and 35A show light distributions of combined light from the right-side and left-side illumination units 705. FIGS. 27B, 29B, 31B, 33B and 35B show light-intensity distributions in FIGS. 27A, 29A, 31A, 33A and 35A, respectively.

As described above, multiple lens units can also be placed so that different light-radiation ranges are combined to form a light-radiation range having a step, as shown in FIGS. 22E and 23E.

In the illumination apparatus 700, by switching on and off light-emitting elements 22 that is placed below each of the lens units 705a to 705g, light can be cut off with respect to a location to which it is not desired to radiate light.

In addition, as shown in FIGS. 25A and 25B, the first lens 701 and the second lens 711 may be formed in a single body in the lens unit 705a. The same shall apply to the lens units 705b to 705g. This is because positional relationships between the first lenses 701 and the second lenses 711 are not varied with the respective lens units in the illumination apparatus 700, in contrast to the first to third embodiments.

FIGS. 26A to 27B show states in which all the light-emitting elements 22 that are placed below the respective lens units 705a to 705g are caused to light up.

FIGS. 28A to 29B show cases in which the light-emitting elements 22 that are placed below the right and left lens units 705a to 705c are switched off so as not to radiate the light to the center.

FIGS. 30A to 31B show cases in which the light-emitting elements 22 that are placed below the left lens units 705a to 705c are switched off, and the light-emitting elements 22 that are placed below the right lens units 705a, 705b and 705d are switched off.

FIGS. 32A to 33B show cases in which all of the light-emitting elements 22 that are placed below the left lens units 705a to 705g are switched on (not switched off), and the light-emitting elements 22 that are placed below the right lens units 705e and 705f are switched off.

FIGS. 34A to 35B show cases in which all of the light-emitting elements 22 that are placed below the left lens units 705a to 705g are switched on (not switched off), and the light-emitting elements 22 that are placed below the right lens units 705f and 705g are switched off.

In the above ways, by switching on and off the light-emitting elements 22 that are placed below the lens units 705a to 705g, the light-radiation range can be changed, and thus, light can be radiated to a targeted-desired region.

The above-described embodiments can be combined. For examples, lenses in the fourth embodiment may be used in illumination apparatuses according to the first to third, and fifth embodiments.

An illumination apparatus according to the invention can be used as an illumination apparatus not only for vehicles but also for a wide variety of transportations. Furthermore, the illumination apparatus can also be used as an illumination apparatus for buildings.

What is claimed is:

1. An illumination apparatus, comprising:
a light-emitting element;
a first lens that is placed facing the light-emitting element and that has a radiation port from which a light beam is emitted; and
a second lens that is placed facing the radiation port, wherein
the first lens further has
a first incident surface that faces the light-emitting element and that guides a light beam from the light-emitting element to the radiation port,
a second incident surface that guides a light beam not passing through the first incident surface to a direction toward the outer periphery of the first lens,
a first reflection surface that reflects a light beam from the second incident surface to guide the light beam to the radiation port, and
a second reflection surface that reflects a light beam passing through the first incident surface and then deviating from a direction toward the radiation port, and a light beam reflected on the first reflection surface and then deviating from the direction toward the radiation portion, to guide these light beams to the radiation port.

2. The illumination apparatus according to claim 1, wherein the second lens emits to a defined region the light beam entering therein from an optical axis.

3. The illumination apparatus according to claim 1, wherein the first lens collects and radiates the light beams that enter therein.

4. The illumination apparatus according to claim 1, wherein a step is provided on a side surface of the first lens.

5. The illumination apparatus according to claim 1, wherein the shape of the radiation port is quadrangular, and a step is provided in one side thereof.

6. The illumination apparatus according to claim 1, wherein parts of sides of the quadrangle of the radiation port are tapered toward a side surface of the first lens.

7. The illumination apparatus according to claim 6, wherein the tapered parts are formed in a staircase pattern.

8. The illumination apparatus according to claim 1, wherein the radiation port of the first lens has a shape that is formed by deleting a part of any one of the followings: quadrangle, ellipse, semi-circle, and semi-ellipse.

9. The illumination apparatus according to claim 1, wherein the light-emitting element comprises multiple light-emitting elements, the first lens comprises multiple first lenses that face the respective multiple light-emitting elements, and that each have the radiation port, and the second lens comprises multiple second lenses that are placed facing the respective radiation ports of the multiple first lenses.

10. The illumination apparatus according to claim 9, wherein a shift amount between positions of centers of the radiation ports of the multiple first lenses and corresponding central axes of the multiple second lenses vary with locations in the illumination apparatus.

11. The illumination apparatus according to claim 9, wherein in at least one of the radiation ports of the multiple first lenses has a shape different from shapes of the other radiation ports.

12. The illumination apparatus according to claim 9, wherein one of the multiple first lenses and a corresponding one of the multiple second lenses form a lens unit, such that multiple lens units are provided, and the multiple lens units have respective different light-radiation regions.

13. The illumination apparatus according to claim 12, wherein the multiple lens units are placed so that the different light-radiation regions are combined to produce a stepped light-radiation region.

14. The illumination apparatus according to claim 9, wherein the radiation ports of the multiple first lenses each have a shape that is formed by deleting a part of any one of the followings: quadrangle, ellipse, semi-circle, and semi-ellipse.

* * * * *